(12) United States Patent
Lin

(10) Patent No.: US 7,881,084 B2
(45) Date of Patent: *Feb. 1, 2011

(54) DC/AC COLD CATHODE FLUORESCENT LAMP INVERTER

(75) Inventor: Yung Lin Lin, Palo Alto, CA (US)

(73) Assignee: O2Micro International Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 12/136,597

(22) Filed: Jun. 10, 2008

(65) Prior Publication Data

US 2008/0246413 A1 Oct. 9, 2008

Related U.S. Application Data

(63) Continuation of application No. 10/935,629, filed on Sep. 7, 2004, now Pat. No. 7,417,382, which is a continuation of application No. 10/776,417, filed on Feb. 11, 2004, now Pat. No. 6,804,129, which is a continuation of application No. 10/132,016, filed on Apr. 24, 2002, now Pat. No. 7,515,445, which is a continuation of application No. 09/850,222, filed on May 7, 2001, now Pat. No. 6,396,722, which is a continuation of application No. 09/437,081, filed on Nov. 9, 1999, now Pat. No. 6,259,615.

(60) Provisional application No. 60/145,118, filed on Jul. 22, 1999.

(51) Int. Cl.
*H02M 3/24* (2006.01)
(52) U.S. Cl. .............................. 363/98; 363/25; 315/307
(58) Field of Classification Search ............ 363/16–20, 363/25, 31, 39–41, 91, 95–98, 131, 132; 315/127–128, 160, 194, 209, 219, 225, 224; 315/247, 86, 277, 291, 307, 309; 307/45, 307/46, 553, 359
See application file for complete search history.

(56) References Cited

U.S. PATENT DOCUMENTS

| 4,277,728 A | 7/1981 | Stevens ........................ 315/307 |
| 4,461,980 A | 7/1984 | Nilssen ........................ 315/225 |

(Continued)

FOREIGN PATENT DOCUMENTS

CN    1444332    9/2003

(Continued)

OTHER PUBLICATIONS

Translation of Japanese Notification and Observations, submitted on Jun. 17, 2003 to Director General of Patent Office, Japanese Patent Application No. 2001-8143, submitted by Noriko Kido.

(Continued)

*Primary Examiner*—Rajnikant B Patel

(57) ABSTRACT

A DC/AC cold cathode fluorescent lamp (CCFL) inverter circuit includes a transformer with a primary winding and a secondary winding for providing increased voltage to a CCFL, a first and second MOSFET switches for selectively allowing direct current of a first polarity and a second polarity to flow through the transformer respectively. The primary and secondary windings of the transformer are electrically coupled to ground. A capacitor divider is electrically coupled to the CCFL for providing a first voltage signal representing a voltage across the CCFL. A first feedback signal line receives the first voltage signal. A timer circuit is coupled to the first feedback signal line for providing a time-out sequence of a predetermined duration when the first voltage signal exceeds a predetermined threshold. A protection circuit shuts down the first switch and the second switch when the first voltage signal exceeds the predetermined threshold after the predetermined duration.

20 Claims, 11 Drawing Sheets

U.S. PATENT DOCUMENTS

| | | | |
|---|---|---|---|
| 4,461,990 A | 7/1984 | Bloomer | 323/235 |
| 4,504,895 A | 3/1985 | Steigerwald | 363/17 |
| 4,535,399 A | 8/1985 | Szepesi | 363/20 |
| 4,541,041 A | 9/1985 | Park et al. | 363/41 |
| 4,592,087 A | 5/1986 | Killion | 381/68 |
| 4,626,979 A | 12/1986 | JaQuay | 363/41 |
| 4,672,258 A | 6/1987 | Konishi | 313/15 |
| 4,672,528 A | 6/1987 | Park et al. | 363/98 |
| 4,682,084 A | 7/1987 | Kuhnel et al. | |
| 4,689,819 A | 8/1987 | Killion | 381/68 |
| 4,727,469 A | 2/1988 | Kammiller | 363/56 |
| 4,794,506 A | 12/1988 | Hino et al. | 363/17 |
| 4,814,962 A | 3/1989 | Magalhaes et al. | 363/16 |
| 4,833,584 A | 5/1989 | Divan | 363/37 |
| 4,855,888 A | 8/1989 | Henze et al. | 363/132 |
| 4,859,912 A | 8/1989 | Lippmann et al. | 315/169.3 |
| 4,860,189 A | 8/1989 | Hitchcock | 363/132 |
| 4,864,483 A | 9/1989 | Divan | 363/37 |
| 4,870,327 A | 9/1989 | Jorgensen | 315/307 |
| 4,904,906 A | 2/1990 | Atherton et al. | 315/291 |
| 4,912,622 A | 3/1990 | Steigerwald et al. | 363/98 |
| 4,935,857 A | 6/1990 | Nguyen et al. | 363/17 |
| 4,939,429 A | 7/1990 | Rodriguez-Cavazos et al. | 315/411 |
| 4,952,849 A | 8/1990 | Fellows et al. | 315/307 |
| 4,953,068 A | 8/1990 | Henze | 363/17 |
| 4,958,108 A | 9/1990 | Jorgensen | 315/307 |
| 4,967,332 A | 10/1990 | Claydon et al. | 363/17 |
| 4,983,887 A | 1/1991 | Nilssen | 315/224 |
| 4,988,920 A | 1/1991 | Hoeksma | 315/101 |
| 4,992,919 A | 2/1991 | Lee et al. | 363/17 |
| 5,012,058 A | 4/1991 | Smith | 219/10.55 |
| 5,017,800 A | 5/1991 | Divan | 307/66 |
| 5,027,263 A | 6/1991 | Harada et al. | 363/16 |
| 5,027,264 A | 6/1991 | Dedoncker et al. | 363/16 |
| 5,051,661 A | 9/1991 | Lee | 315/225 |
| 5,105,127 A | 4/1992 | Lavaud et al. | 315/291 |
| 5,113,334 A | 5/1992 | Tuson et al. | 363/25 |
| 5,132,888 A | 7/1992 | Lo et al. | 363/17 |
| 5,132,889 A | 7/1992 | Hitchcock et al. | 363/17 |
| 5,157,592 A | 10/1992 | Walters | 363/17 |
| 5,166,579 A | 11/1992 | Kawabata et al. | 315/209 |
| 5,198,969 A | 3/1993 | Redl et al. | 363/17 |
| 5,208,740 A | 5/1993 | Ehsani | 363/124 |
| 5,231,563 A | 7/1993 | Jitaru | 363/98 |
| 5,235,501 A | 8/1993 | Stuart et al. | 363/17 |
| 5,239,293 A | 8/1993 | Barbier | |
| 5,268,830 A | 12/1993 | Loftus, Jr. | 363/17 |
| 5,270,620 A | 12/1993 | Basch et al. | 315/291 |
| 5,285,372 A | 2/1994 | Huynh et al. | 363/132 |
| 5,287,040 A | 2/1994 | Lestician | 315/291 |
| 5,291,382 A | 3/1994 | Cohen | 363/16 |
| 5,305,191 A | 4/1994 | Loftus, Jr. | 363/17 |
| 5,311,104 A | 5/1994 | Antle | 315/307 |
| 5,315,498 A | 5/1994 | Berrios et al. | 363/98 |
| 5,363,020 A | 11/1994 | Chen et al. | 315/209 |
| 5,384,516 A | 1/1995 | Kawabata et al. | 315/160 |
| 5,402,043 A | 3/1995 | Nilssen | 315/307 |
| 5,402,329 A | 3/1995 | Wittenbreder, Jr. | 363/16 |
| 5,412,557 A | 5/1995 | Lauw | 363/37 |
| 5,418,703 A | 5/1995 | Hitchcock et al. | 363/17 |
| 5,420,779 A | 5/1995 | Payne | 363/56 |
| 5,422,546 A | 6/1995 | Nilssen | 315/219 |
| 5,430,632 A | 7/1995 | Meszlenyi | 363/17 |
| 5,430,641 A | 7/1995 | Kates | 363/133 |
| 5,438,242 A | 8/1995 | Simpson | 315/219 |
| 5,448,155 A | 9/1995 | Jutras | 323/285 |
| 5,448,467 A | 9/1995 | Ferreira | 363/17 |
| 5,451,041 A | 9/1995 | Greive | |
| 5,464,836 A | 11/1995 | Camaggi et al. | 514/239.2 |
| 5,481,160 A | 1/1996 | Nilssen | 315/209 |
| 5,481,163 A | 1/1996 | Nakamura et al. | 315/308 |
| 5,486,740 A | 1/1996 | Yamashita et al. | 315/308 |
| 5,495,405 A | 2/1996 | Fujimura et al. | 363/133 |
| 5,510,974 A | 4/1996 | Gu et al. | 363/134 |
| 5,514,921 A | 5/1996 | Steigerwald | 307/125 |
| 5,546,300 A | 8/1996 | Lee et al. | 363/132 |
| 5,559,688 A | 9/1996 | Pringle | 363/89 |
| 5,565,740 A * | 10/1996 | Hiramatsu et al. | 315/209 R |
| 5,583,402 A | 12/1996 | Moisin et al. | 315/307 |
| 5,606,224 A | 2/1997 | Hua | 315/121 |
| 5,615,093 A * | 3/1997 | Nalbant | 363/25 |
| 5,619,104 A | 4/1997 | Eunghwa | 315/159 |
| 5,619,402 A | 4/1997 | Liu | 363/20 |
| 5,638,260 A | 6/1997 | Bees | 363/17 |
| 5,646,836 A | 7/1997 | Sadarnac et al. | 363/98 |
| 5,652,479 A | 7/1997 | LoCascio et al. | 315/225 |
| 5,657,220 A | 8/1997 | Yan | 363/132 |
| 5,669,238 A | 9/1997 | Devers | 62/657 |
| 5,677,602 A | 10/1997 | Paul et al. | 315/224 |
| 5,684,683 A | 11/1997 | Divan et al. | 33/65 |
| 5,694,007 A | 12/1997 | Chen | 315/247 |
| 5,712,533 A | 1/1998 | Corti | 315/169 |
| 5,715,155 A | 2/1998 | Shahanj et al. | 363/132 |
| 5,719,474 A | 2/1998 | Vitello | 315/307 |
| 5,719,759 A | 2/1998 | Wagner et al. | 363/132 |
| 5,731,652 A | 3/1998 | Shimada | 310/316 |
| 5,736,842 A | 4/1998 | Jovanovic | 323/222 |
| 5,742,134 A | 4/1998 | Wacyk et al. | |
| 5,742,495 A | 4/1998 | Barone | 363/65 |
| 5,742,496 A | 4/1998 | Tsutsumi | 363/95 |
| 5,744,915 A | 4/1998 | Nilssen | 315/209 |
| 5,748,457 A | 5/1998 | Poon et al. | 363/17 |
| 5,764,494 A | 6/1998 | Schutten et al. | 363/17 |
| 5,774,346 A | 6/1998 | Poon et al. | 363/17 |
| 5,781,418 A | 7/1998 | Chang et al. | 363/16 |
| 5,781,419 A | 7/1998 | Kutkut et al. | 363/17 |
| 5,784,266 A | 7/1998 | Chen | 363/16 |
| 5,796,598 A | 8/1998 | Nowak et al. | 363/37 |
| 5,818,172 A | 10/1998 | Lee | 315/86 |
| 5,818,669 A | 10/1998 | Mader | |
| 5,834,889 A | 11/1998 | Ge | 313/493 |
| 5,834,907 A | 11/1998 | Takehara | |
| 5,844,378 A | 12/1998 | LoCascio et al. | |
| 5,844,540 A | 12/1998 | Terasaki | 345/102 |
| 5,854,617 A | 12/1998 | Lee et al. | 345/102 |
| 5,856,916 A | 1/1999 | Bonnet | 363/20 |
| 5,870,298 A | 2/1999 | Hung | 363/98 |
| 5,875,103 A | 2/1999 | Bhagwat et al. | 363/17 |
| 5,880,940 A | 3/1999 | Poon | 363/20 |
| 5,886,477 A | 3/1999 | Honbo et al. | 315/209 |
| 5,886,884 A | 3/1999 | Baek et al. | 363/48 |
| 5,894,412 A | 4/1999 | Faulk | 363/56 |
| 5,910,709 A | 6/1999 | Stevanovic et al. | 315/225 |
| 5,917,722 A | 6/1999 | Singh | 363/132 |
| 5,923,129 A | 7/1999 | Henry | 315/307 |
| 5,930,121 A | 7/1999 | Henry | 363/16 |
| 5,930,122 A | 7/1999 | Moriguchi et al. | 363/17 |
| 5,932,976 A | 8/1999 | Maheshwari et al. | 315/291 |
| 5,939,830 A | 8/1999 | Praiswater | 315/169 |
| 5,946,200 A | 8/1999 | Kim et al. | 363/17 |
| 5,949,197 A | 9/1999 | Kastner | 315/291 |
| 5,965,989 A | 10/1999 | Mader | |
| 6,002,210 A | 12/1999 | Nilssen | 315/219 |
| 6,008,590 A | 12/1999 | Giannopoulos et al. | |
| 6,011,360 A | 1/2000 | Gradzki et al. | 315/244 |
| 6,016,052 A | 1/2000 | Vaughn | 323/355 |
| 6,051,940 A | 4/2000 | Arun | 315/307 |
| 6,114,814 A | 9/2000 | Shannon et al. | 315/219 |
| 6,151,232 A | 11/2000 | Furuhashi et al. | 363/97 |
| 6,198,234 B1 | 3/2001 | Henry | 315/291 |
| 6,198,236 B1 | 3/2001 | O'Neill | |
| 6,259,615 B1 | 7/2001 | Lin | 363/98 |
| 6,313,976 B1 | 11/2001 | Balakrishnan et al. | |

| | | | | |
|---|---|---|---|---|
| 6,396,722 | B2 | 5/2002 | Lin ............................ | 363/98 |
| 6,469,454 | B1 | 10/2002 | Mader et al. | |
| 6,501,234 | B2 | 12/2002 | Lin et al. .................... | 315/307 |
| 6,567,866 | B1 | 5/2003 | Poisner | |
| 6,804,129 | B2 | 10/2004 | Lin ............................ | 363/98 |
| 6,815,906 | B1 | 11/2004 | Aarons et al. ............... | 315/209 |

FOREIGN PATENT DOCUMENTS

| | | | | |
|---|---|---|---|---|
| GB | 2213613 | 8/1989 | | |
| JP | 59032370 | 2/1984 | | |
| JP | 06251591 | 9/1994 | | |
| JP | 07211472 | 8/1995 | | |
| JP | 08288080 | 11/1996 | | |
| JP | 2733817 | 1/1998 | | |
| JP | H11-3039 | 1/1999 | | |
| JP | 11-146655 | 5/1999 | ..................... | 7/48 |
| JP | 2000-197368 | 7/2000 | ..................... | 7/48 |
| JP | 2003168591 | 6/2003 | | |
| WO | WO 98/09369 | 3/1998 | | |
| WO | 0223958 A2 | 3/2002 | | |

OTHER PUBLICATIONS

Translation of Japanese Notification and Observations, submitted on Jun. 16, 2003 to Director General of Patent Office, Japanese Patent Application No. 2001-8143, submitted by Mayuka Matsumae.

Translation of Japanese Notification and Observations, submitted on Jun. 9, 2003 to Commissioner of the Japanese Patent Office, Japanese Patent Application No. 2001-8143, submitted by Hiromi Goto.

Chinese Encyclopedia of Electrical, pp. 564-565, Aug. 1994, Taipei Taiwan.

English translation of Cancellation Brief filed by Monolithic Power Systems, Inc. in corresponding Taiwan Patent No. NI-152318, 7 pages.

English Translation of Defense Statement filed by O2 Micro International Limited in response to Cancellation Brief filed by Monolithic Power Systems, Inc. submitted on May 20, 2003, 9 pages.

English Translation of Supplementary Cancellation Brief filed my Monolithic Power Systems, Inc. submitted on Nov. 11, 2003, 19 pages.

English Translation of Supplementary Defense Statement filed by O2 Micro International Limited submitted on Jan. 19, 2004, 15 pages.

English Translation of Cancellation Brief filed by Beyond Innovation Technology Co., in corresponding Patent No. NI-152318, 12 pages.

English Translation of Abstract of Taiwan patent No. 357481, submitted by Beyond Innovation Technology Co., Ltd. in Cancellation Brief.

English Translation of Defense Statement filed by O2Micro International Limited in response to Cancellation Brief filed by Beyond Innovation Technology Co., Ltd., submitted on May 18, 2004, 12 pages.

English Translation of Cancellation Brief filed by Mr. Tsan-Jung Chen in corresponding Taiwan Patent No. NI-152318, 58 pages.

English Translation of Power Electronics: Converters, Applications and Designs, pp. 10-49 to 10-50, 2 pages cited by Mr. Tsan-Jung Chen in Cancellation Brief.

English Translation of Defense Statement by O2Micro International Limited in response to Cancellation Brief filed by Mr. Tsan-Jung Chen, submitted on May 30, 2003, 14 pages.

English Translation of Supplementary Defense Statement by O2Micro International Limited in response to Cancellation Brief filed by Mr. Tsan-Jung Chen, submitted on Mar. 19, 2004, 12 pages.

Summary Translation of Taiwanese Office Action in corresponding Taiwanese Application No. 089114672N01, 2 pages.

Supplementary Defense Statement for ROC Pat Application. No. 089114672N01 Submitted on May 6, 2005; Title High-Efficiency Adaptive DC/AC Converter.

Supplementary Defense Statement for ROC Pat. Application. No. 089114672N02 Submitted on May 6, 2005; Titled "'High-Efficiency Adaptive DC/AC Converter".

Supplementary Defense Statement for ROC Pat. Application. No. 089114672N03 Submitted on Apr. 29, 2005; Titled "High-Efficiency Adaptive DC/AC Converter".

Cancellation Decision of the Intellectual Property Office Patent Application No. under Cancellation: 089114672N01: Issuance Date May 26, 2005.

Cancellation Decision of the Intellectual Property Office Patent Application No. under Cancellation: 089114672N02: Issuance Date May 26, 2005.

Cancellation Decision of the Intellectual Property Office Patent Application No. under Cancellation: 089114672N03: Issuance Date May 26, 2005.

"Phase Shift Resonant Controller." Application Note US1879, UC2879, UC3879, Unitrode Corp., Jun. 1998: 1-6.

"Zero-Voltage Switching Technique in DC/DC Converters", Kwang-Hwa Liu and Fred C. Lee, Department of Electrical Engineering, Virginia Polytechnic Institute and State University. 1986 IEEE, Reprinted with permission; PESC 86; Vancouver BC, Jun. 23-27, 1986; pp. 58-70.

"A Comparative Study of a Class of Full Bridge Zero-Voltage-Switched PWM Converters" W.Chen, F.C. Lee, M.M. Jovanovic and J.A. Sabate1995 IEEE, pp. 893-899. Virginia Power Electronics Center, The Bradley Department of Electrical Engineering.

"A Frequency/PWM Controlled Converter with Two Independently Regulated Outputs" R.A. Fisher, R.L. Steigerwald, C.F. Saj, GE Corporate Research and Development Center, HFPC May 1989 Proceedings pp. 459-471.

"A New and Improved Control technique Greatly Simplifies the Design of ZVS Resonant Inverters and DC/DC Power Supplies" Memet Nalbant, Linfinity Microelectronics (formerly Silicon General), 1995 IEEE, pp. 694-701.

"An Introduction to the Principles and Features of Resonant Power Conversion" Steve Freeland; Rockwell International Corporation, Autonetics ICBM Systems Division. pp. 20-43.

"Switching Power Supply Design" Abraham I. Pressman, Copyright 1991, by McGraw-Hill inc, Chapter 3 pp. 93-104, Chapter 13 pp. 471-492.

"Feasible Characteristics Evaluations of Resonant Tank PWM Inverter-Linked DC-DC High-Power Converters for Medical-Use High-Voltage Applications", H. Takano, J. Takahashi, M. Nakaoka. 1995 IEEE, pp. 913-919.

"Fixed-Frequency, Resonant-Switched Pulse Width Modulation with Phase-Shifted Control", Bob Mammano and Jeff Putsh, Sep. 1991, pp. 5-1thru 5-7.

"High Density Power-Hybrid Design of a Half-Bridge Multi-Resonant Converter", Richard Farrington, et al. May 1990. Proceedings pp. 26-33.

Optimum ZVS Full-bridge DC/DC Converter with PWM Phase-Shift Control: Analysis, Design Considerations, and Experimental Results, Redl, et al. 1994 IEEE, pp. 159-165.

Unitrode Application Note U136, Phase Shifted, Zero Voltage Transition Design Considerations and the UC3875 PWM Controller Bill Andreycak, SLUA107 May 1997 pp. 1-14.

"Zero-Voltage Switching Resonant Power Conversion" Bill Andreycak, pp. A2-1 thruA2-3A.

"Resonant Mode Converter Topologies" Bob Mammano, pp. P3-1 thru P3-12.

"Small-Signal Analysis of the Zero-Voltage Switched Full-Bridge PWM Converter", V. Vlatkovic, et al. HFPC May 1990 Proceedings, pp. 262-269.

Unitrode Corporation U154, "The New UC3879 Phase-Shifted PM Controller Simplifies the Design of Zero Voltage Transition Full-Bridge Converters", Laszlo Balogh, pp. 1-8.

Shiga International Patent Office, English Translation of Citation 8 (CCFL Inverter Design AN01 Using MP1010), Monolithic Power Systems Inc. Excerpt from MSP Co. Applications Notes AN01 v.11 May 1999 pp. 1-7.

MPS Monolithic Power Systems, Inc. "Cold Cathode Fluorescent lamp" MP1010 Preliminary Data Sheer v.2 Feb. 1999 pp. 1-6.

LG Philips LCD Specification for Approval Liquid Crystal Display, LC300W01 Titled"30.0 WXGA TFT LCD" pp. O2 615 009475-O2 615 009502.

LG Philips LCD Specification for Approval Liquid Crystal Display, LM181E1-H2MN Titled "18.1 SXGA TFT LCD" pp. O2-615 009398-O2 615 009421.

Official Monthly Publication of the Society for Information Display, Nov. 1989 vol. 5, No. 11pp. ERI 009217-ERI 009223.
LG Philips LCD Specification for Approval Liquid Crystal Display, LB121S1-A2 Titled"12.1 SVGA TFT LCD" pp. O2 615 009226-O2 615 009247.
LG Philips LCD Specification for Approval Liquid Crystal Display, BLB121S1-N Titled"12.1 SVGA TFT LCD" pp. O2 615 009248-O2 615 009271.
Bi-Search International, Inc. BLB121S1-S Specification for Approval Titled"12.1 SVGA TFT LCD" pp. O2 615 00272-O2 615 009295.
LG Philips LCD Specification for Approval Liquid Crystal Display, LM151X05 Titled"15.1 XGA TFT LCD" pp. O2-615 009296-O2 615 009319.
LG Philips LCD Specification for Approval Liquid Crystal Display, LC151X01 Titled"15.1 XGA TFT LCD" pp. O2-615 009320-O2 615 009371.
LG Philips LCD Specification for Approval Liquid Crystal Display, LM181E06 Titled"18.1 SXGA TFT LCD" pp. O2-615 009372-O2 615 009397.
LG Philips LCD Specification for Approval Liquid Crystal Display, LM201U1-A3 Titled"20.1 UXGA TFT LCD" pp. O2-615 009422-O2 615 009448.
LG Philips LCD Specification for Approval Liquid Crystal Display, LM220W1-A2MN Titled"22.0 WSXGA TFT LCD" pp. O2-615 009449-O2 615 009474.
Advanced Power Technology, Ken Dierberger, APT9703, Application Note "A New Generation of Power MOSFET Offers Improved Performance at Reduced Cost" pp. 1-32.
United States District Court for the Northern District of California. Case No. C-00-4071 CW and C-01-3995 CW Order Construing Disputed Claims and Terms *O2 Micro International Limited v Monolithic Power Systems, Inc & Monolithic Power Systems, Inc V. O 2 Micro International Limited* (Counterclaims) Dated Dec. 27, 2002.
United States District Court Northern District of California San Francisco Division. Case No. C 01 3995 JCS ADR Monolithic Power Systems Answer to the First Amended Complaint and Counterclaim *O2 Micro International Limited v Monolithic Power Systems, Inc & Monolithic Power Systems, Inc V. O 2 Micro International Limited* (Counterclaims) Dated Dec. 5, 2001.
United States District Court Northern District of California Oakland Division. Case No. CV-00-4071 CW and CV-01-3995 Defendant Monolithic Power Systems Final Invalidity Contentions *O2 Micro International Limited v Monolithic Power Systems, Inc & Monolithic Power Systems, Inc V. O 2 Micro International Limited* (Counterclaims) Dated Feb. 5, 2003.
United States District Court Northern District of California Oakland Division. Case No. CV-00-4071 CW (EDL) Defendant Monolithic Power Systems Preliminary Invalidity Contentions *O2 Micro International Limited v Monolithic Power Systems, Inc & Monolithic Power Systems, Inc V. O 2 Micro International Limited* (Counterclaims) Dated Jun. 7, 2002.
United States District Court Northern District of California Oakland Division. Case No. DV-00-4071 CW and CV-01-3995 CW Defendant and Counterclaimant Monolithic Power Systems Responsive Claim Construction Brief *O2 Micro International Limited v Monolithic Power Systems, Inc & Monolithic Power Systems, Inc V. O 2 Micro International Limited* (Counterclaims) Dated Sep. 6, 2002.
United States District Court Northern District of California Oakland Division. Case No. CV-00-4071 CW and CV-01-3995 CW Defendant and Counterclaimant Monolithic over Systems Surreply Claim Construction Brief *O2 Micro International Limited v Monolithic Power Systems, Inc & Monolithic Power Systems, Inc V. O 2 Micro International Limited* (Counterclaims) Dated Sep. 20, 2002.
Notice of Reasons for Rejection; Mailing date Nov. 2, 2004, Mailing No. 401750 Ref. No. F08427A1, Application No. 2001-008143 10 Pages.
Decision of Rejection; mailing Date May 24, 2005, Mailing No. 184858 Ref No. F08427A1 Application No. 2001-008143 2 Pages.
Japanese Notification & Observation document 2001-008143 18 Pages.
English Translation of p. 38 of Citation 6; Shiga International patent Office 3 pages.
Fuji Electrics Development Specifications; 2001-008143 16 Pages.
Data Sheet (74HC/HCT4046A) Philips Semiconductors , Nov. 25, 1997.
Translation of Provisional Rejection dated Sep. 5, 2005 from the Korean Intellectual Property Office. Notice of Provisionally Rejection Application No. 2001-0001901.
English Translation Japanese Notification & Observation document 2001-008143: 29 Pages + previously submitted Japanese Notification & Observation Documents 18 pages.
Fuji Electric Chip data sheet dated Aug. 1999; SE 146960-75; SE 146944-59.
LinFinity Microelectronics LXM1640-01 "Direct Drive Quad Lamp CCFL Inverter Module" Product Data Sheet p. 1, 2 4, 5. 11861 Western Ave, Garden Grove, CA 92841 Copyright 1998.
Unitrode Products from Texas Instruments—"BiCMOS Cold Cathode Fluorescent Lamp Driver Controller." UCC1972/3-UCC2972/3-UCC3972/3 Oct. 1998—Revised Nov. 2000; 17 pages.
Product Innovations Electronic Design/Jul. 10, 1995, "DC-to-AC Inverter Ups CCFL Lumens per Watt", by Frank Goodenough—p. 44-48.
LinFinity Microelectronics LXM1653-01 "Floating Output Drive, CCFL Inverter Modules" p. 1-6 11861 Western Ave, Garden Grove, CA 92841 LIN Doc#: 1653.
"An Intelligent Inverter for a high-power LCD backlight" By, T. Yana, F. HANzawa, Y. Watanabe, Journal of the SID 7/3, 1999 p. 163-166.
BiTEK's Preliminary Invalidity Contentions for U.S. Patent 6,804,129—pp. 1-5.
MPS Monolithic Power Systems Inc. MP1011 Cold Cathode Fluorescent Lamp Driver 4 pgs.
MPS Monolithic Power Systems Inc. MP1010 Cold Cathode Fluorescent Lamp Driver 6 pgs.
Fairchild Semiconductor ML4818 Phase Modulation/Soft Switching Controller Rev 1.0 Oct. 10, 2000 12 pgs.
Resonant Fluorescent Lamp Converter Provides Efficient and Compact Solution 0-7803-0982-0/93 $3.00 1993 IEEE pp. 424-431.
Integrated Circuits Unitrode Resonant Fluorescent Lamp Driver UC1871 UC2871 UC3871 6 pgs.
A New CCFL Inverter Circuit for AMCLD Panels Results in Significantly Higher Efficiency and Brightness. Mehmet Nalbant Linfinity Microelectronics AMLCD 1995 4 pgs.
OZ962-DS-010 "High Efficiency Inverter Controller" MPS 093340-MPS 093349—O2 Micro Breathing Life into Computing 10 pages.
"Class DE Inverters and Rectifiers for DC-DC Converters" by David C. Hamill; Department of Electronics Engineering University of Surrey, Guildford GU2 5XH, United Kingdom 8 Pages.
"ARC Discharge Supply Component Protection Circuitry" A.F. Ahrens and G. L. Cardwell, Space and Communications Group, Hughes Aircraft Company, El Segundo, California, p. 326-333.
Design of a 10 kW, 500 kHz Phase-Shift Controlled Series-Resonant Inverter for Induction Heating L. Grajales, J.A. Sabate, K.R. Wang, W.A. tabisz and F.C. Lee pp. 843-849.
A Phase-Difference Angle Control-Mode PWM High-Frequency Resonant Inverters Using Static Induction-Transistors and-Thyristors M. Nakatoka, T. Maruhashi, T. Koga, S. Sugawara and T. Nishimura, Department of Electrical Engineering, Kobe University, Kobe 657 Japan 0275-9306/87/0000-0674 $1.00 1987 IEEE 674-681.
Linfinity Microelectronics LXM1592/LXM1593 Floating Output Drive Customizable CCFL Inverter Modules Preliminary Data Sheet 15 pgs.
Micro Linear ML4877 Feb. 1997 Databook LCD Backlight Lamp Driver 8 pgs.
Micro Linear ML4878 Feb. 1997 Databook LCD Backlight Lamp Driver 8 pgs.
Fairchild Semiconductor Application Note 42010 George A Hall and Urs Mader, Theory and Application of the ML4874 and ML4876 LCD Backlight Controller ICs Jun. 1996 Rev. 01 Oct. 25, 2000 12 pgs.
Unitrode Application Note U-162 Ron Florello Unitrode Corporation, Driving a 35W AC Metal Halide High Intensity Discharge Lamp with the UCC3305 HID Lamp Controller 13 pgs.
Integrated Circuits Unitrode HID Lamp Controller UCC2305 UCC3305 8 pgs.

The LCC Inverter as a Cold Cathode Fluorescent Lamp Driver, Joel A. Donahue, P.E. and Mialn M. Jovanovic, Delta Power Electronics Lab, 0-7803-1456-5/94 $4.00 1994 IEEE 7 pgs.

IEEE Transactions on Industrial Electronics vol. 42, No. 1 Feb. 1995, Analysis and Design-Optimization of LCC Resonant Inverter for High-Frequency AC Distributed Power System J.A. Sabate, M.M. Jovanovic, Senior Member, IEEE F.C. Lee, Fellow, IEEE and R.T. Gean pp. 63-71.

A Low-Cost Control IC for Single-Transistor ZVS Cold-Cathode Fluorescent Lamp Inverters and DC/DC Converters, Richard Redl, ELFI S.A. Derrey-la-Cabuche CH-1756 Onnens FR Switzerland, Koji Arakawa Toko, Inc. 18 Oaza Gomigaya Tsurugashimashi Saitama 350-02 Japan 8 pgs.

Modern DC-to-DC Switchmode Power Converter Circuits, Rudolf P. Severns President Sprintime Enterprises Inc. Bloom Associates Inc. Gordon (ed) Bloom Copyright 1985 by Rudolph R. Severns and Gordon Bloom 4 pgs.

Switch Mode Power Conversion Basic Theory and Design by K.Kit Sum Chief Engineer LH Research Inc. Tustin, California. Markel Dekker Inc, New York and Basel Copyright 1984 3 pgs.

EDN The Design Magazine of the Electronic Industry Feb. 15, 1996 Out in Front Whats Hot in the Design Community Edited by Fran Granville. Reprinted from EDN by Cahners Publishing Company 1996 1 page.

Testing and Analysis of CS-ZVS Bases Floating and Non-Floating CCFL Inveters and Modeling of the Lamp to Panel Leakage Currents, Mehmet K. Nalbant Linfinity Microelectronics 9 pgs.

IEEE Transactions of Power Electronics vol. 13 No. 3 May 1998, Analysis, Design, and Optimization of the LCC Resonant Inverter as a High-Intensity Discharge Lamp Ballast J. Marcos Alonso, Member IEEE, Cecilio Blanco, Member IEEE, Emilio Lopez, Antonio J. Calleja, Student Member, IEEE, and Manuel Rice, Member IEEE pp. 573-585.

Pulsewidth Modulation Control of Electronic Ballas for Dimming Control of Fluorescent Lamps, Christian Branas, Francsico J. Azcondo, Salvador Bracho, Department of Electronics Technology, System Engineering and Automation University of Cantabria 39005 Sanunder, Spain pp. 537-542.

Switched Mode Transistor Amplifiers M.L. Stephens Member IEEE J.P. Wittman Senior Member IEEE, Sep. 1963 pp. 3.

Resonant Power Converters, Marian Kazimierczuk Wright State University, Dariusz Czarkowski University of Florida Copyright 1995 by John Wiley & Sons, Inc. 5 pgs.

Linfinity Microelectronics Infinite Power of Innovation LXM1597-01 5V CCFL Inverter Modules Preliminary Data Sheet, Copyright 1995, Rev .4 May 1996 pp. 5.

*O2 Micro International Limited* (Plaintiff) v. *Samsung Electronics Co., Ltd.* (Defendant)—Case No. 2-04CV-323 Jury-Complaint for Patnet Infringement 47 pages Voltages and Frequencies (Single Phase), 1987, First Edition.

*O2 Micro International Limited* (Plaintiff) v. *Samsung Electronics Co., Ltd., Samsung Electronics America, Inc., Samsung SDI Co., Ltd., and Samsung SDI America, Inc.* (Defendants)—Case No. 2-04CV-323 (Ward) Jury-First Amended Complaint for Patent Infringement 7 pages.

*O2 Micro International Limited* (Plaintiff) v. *Samsung Electronics Co., Ltd., Samsung Electronics America, Inc., Samsung SDI Co., Ltd., and Samsung SDI America, Inc.* (Defendants)—Civil Action No. 2-04CV-323 (Ward) Defendants Samsung Electronics Co., Ltd. and Samsung Electronics America, Inc.'s Anser to Plaintiff's First Amended Complaint and Counterclaims 11 pages.

*O2 Micro International Limited* (Plaintiff) v. *Samsung Electronics Co., Ltd., Samsung Electronics America, Inc., Samsung SDI Co., Ltd., and Samsung SDI America, Inc.* (Defendants)—Case No. 2-04CV-323 Jury—Plaintiff O2 Micro International Limited's Reply to Counter-Defendants Samsung Electronics Co., Ltd's and Samsung Electronics America, Inc.'s Counterclaims 5 pages.

*O2 Micro International Limited* (Plaintiff) v. *Samsung Electronics Co., Ltd., Samsung Electronics America, Inc., Samsung SDI Co., Ltd., and Samsung SDI America, Inc.* (Defendants)—Civil Action No. 2-04CV-323 (Ward) Defendants Samsung SDI Co., Ltd. and Samsund SDI America, Inc.'s Answer to Plaintiffs First Amended Complaint, and Counterclaims 11 pages.

*O2 Micro International Limited* (Plaintiff) v. *Samsung Electronics Co., Ltd., Samsung Electronics America, Inc., Samsung SDI Co., Ltd., and Samsung SDI America, Inc.* (Defendants)—Case No. 2-04CV-323 Jury—Plaintiff O2 Micro International Limited's Reply to Defendants Samsung SDI C., Ltd. and Samsund SDI America, Inc.'s Counterclaims 5 pages.

*O2 Micro International Limited* (Plaintiff) v. *Samsung Electronics Co., Ltd., Samsung Electronics America, Inc., Samsung SDI Co., Ltd., and Samsung SDI America, Inc.* (Defendants)—Civil Action No. 2-04CV-323 TJW—Plaintiff O2 Micro International Limited's Opening Claim Construction Brief 50 Pages.

*O2 Micro International Limited* (Plaintiff) v. *Samsung Electronics Co., Ltd., Samsung Electronics America, Inc., Samsung SDI Co., Ltd., and Samsung SDI America, Inc.* (Defendants)—Civil Action No. 2-04CV-323 TJW—Plaintiff O2 Micro International Limited's Amended Opening Claim Construction Brief 50 Pages.

*O2 Micro International Limited* (Plaintiff) v. *Samsung Electronics Co., Ltd., Samsung Electronics America, Inc.*, (Defendants)—Civil Action No. 2-04CV-323 TJW Jury—Samsung Electronics Co., Ltd. and Samsung Electronics America, Inc.'s Responsive Brief on Claim Construction 44 pages.

*O2 Micro International Limited* (Plaintiff) v. *Samsung Electronics Co., Ltd., Samsung Electronics America, Inc., Samsung SDI Co., Ltd., and Samsung SDI America, Inc.* (Defendants)—Civil Action No. 2-04CV-323 Ward—Defendant Samsung Electronics Co., Ltd. and Samsung Electronics America, Inc.'s First Amended Answer 18 pages.

*O2 Micro International Limited* v. *Samsung Electronics Co. Ltd., et al.*—Civil Action No. 2-04-CV-323 Memorandum Opinion and Order 16 pages.

*O2 Micro International Limited* (Plaintiff) v. *Samsung Electronics Co., Ltd. and Samsung Electronics America, Inc.* (Defendants) Civil Action No. 2-04-CV-323 (Ward) Defendants Samsung Electronics Co., Ltd. and Samsung Electronics America, Inc.'s Second Amended Answer 19 pages.

*O2 Micro International Limited* (Plaintiff) v. *Sansung Electronics Co., Ltd, Samsung Electronics America, Inc., Samsung SDI Co., Ltd and Samsung SDI America, Inc.* (Defendants)—Civil Action No. 2-04-CV-323 (Ward) Order Granting Samsung Electronics Co., Ltd. and Samsun Electronics America, Inc.'s Unopposed Motion for Leave to File a Second Amended Answer 1 page.

*O2 Micro International Limited* (Plaintiff) v. *Samsung Electronics Co., Ltd. and Samsung Electronics America, Inc.* (Defendants) Civil Action No. 2-04-CV-323 (Ward) Defendants Samsung Electronics Co., Ltd. and Samsung Electronics America, Inc.'s Unopposed Motion for Leave to File a Second Amended Answer 4 pages.

*O2 Micro International Limited*, (Plaintiff) v. *Rohm Co., Ltd, Consy Corporation, Sony EMCS Corporation, Sony Corporation of America, and Sony Electronics Inc.* (Defendants) Case No. 2-05CV-211 Jury Trial Demanded Complaint for Patent Infringement 7 pages.

*O2 Micro International Limited* (Plaintiff) v. *Rohm Co., Ltd. Sony Corporation, Sony EMCS Corporation, Sony Corporation of America and Sony Electronics Inc.* (Defendants) Case No. 2-05CV-211 DF E-Filing Special Appearance Defendant Rohm Co. Ltd.'s Answer and Counterclaims to Plaintiff's Complaint 10 pages.

*O2 Micro International Limited* (Plaintiff) v. *Rohm Co. Ltd. Sony Corporation, Sony EMCS Corporation, Sony Corporation of America and Sony Electronics, Inc.* (Defendants) Case No. 2-05CV-211 (Folsom) Jury-Sony Corporation, Sony EMCS Corporation, Sony Corporation of America and Sony Electronics Inc.'s Answer to O2 Micro's Complaint 29 pages.

Bitek *O2Mirco International Limited* Plaintiff v. *Beyond Innovation Technology Co., Ltd., SPI Electronics Co., Ltd., FSP Group, Lien Chang Electronic Enterprise Co., Ltd*, Defendants. and Related Counterclaims. Civil Action No. 2-04-CV-32(TJW) Assigned for All Purpose to the Honorable Judge T. John Ward Jury Trial Demanded—Defendant Beyond Innovation Technology Co., Ltd's Final Invalidity Contentions 5 pages Exhibits 8, 10, 12-14, 15a, 15b, 16, 18-23, 28, 30, 32, 34, 36, 38-40, 42, 43, 45-48.

Hon Hai *O2Micro International Limited*, Plaintiff v. *Hon Hai Precision Industry Co., Ltd a/k/a/ Foxconn and Ambit Microsystems Cor-*

*poration* Defendants. Case No. 2-05CV-323 (TJW). Hon Ahi Precision Industry Co., Ltd.'s Preliminary Invalidity Contentions 33 pages.

Hsing *O2 Micro International Limited*, Plaintiff v. *Monolithic Power Systems, Inc.* Defendants. Michael Hsing's Preliminary Invalidity Contentions and Monolithic Power Systems Inc.s and Asustek Computer Inc.s Supplemental Invalidity Contentions 27 Pages.

MPSTX Case No. 2:04-CV-359 TJW Monolithic Power Systems, Inc. and Asuestek Computer Inc.s Preliminary Invalidity Contentions 23 pages 12 Exhibits 1-26.

Sumida *O2Micro International Limited*, Plaintiff v. *Taiwan Sumida Electronics, Inc.* Defendant Civil Action No. 2-03CV-007-TJW (Judge Ward) Defendant Taiwan Sumida Electronics, Inc. Final Invalidity Contentions 6 pages Exhibits 1, 2, 4, 7, 8, 10.

Case No. C04 02000: *Monolithic Power Systems, Inc.* v. *O2 Micro International Ltd.*—Complaint for Declaratory Judgement Document 1, filed May 20, 2004 total 6 pages.

Case No. 4:04-cv-02000-CW: *Monolithic Power Systems, Inc.* v. *O2 Micro International.*—Answer to O2 Micro's First Amended Counterclaim Document 22 Filed Sep. 14, 2004 total 5 pages.

Case No. 4:04-cv-02000-CW: *Monolithic Power Systems, Inc.* v. *O2 Micro International Ltd.*—Motion and Brief in Support of Monolithic Power Systems' Motion for Summary Judgment That the Claims of the O2 Micro '722 Patent Are Not Valid Document 132 Filed Mar. 21, 2006 total 26 pages.

Case No. 4:04-cv-02000-CW: *Monolithic Power Systems, Inc.* v. *O2 Micro International Ltd.*—Reply in Support of Monolithic Power Systems' Motion for Summary Judgment That the Claims of the O2 Micro '722 Patent Are Not Valid Document 161 Filed Apr. 11, 2006 total 17 pages.

Case No. 4:04-cv-02000-CW: *Monolithic Power Systems, Inc.* v. *O2 Micro International Ltd.*—Joint Claim Construction and Prehearing Statement [Patent L.R.4-3] and Exhibit A-J Document 172 and 172-2-172-11 Filed Apr. 20, 2006 total 237 pages.

Case No. 4:04-cv-02000-CW: *Monolithic Power Systems, Inc.* v. *O2 Micro International Ltd.*—Monolithic Power Systems, Inc.'s First Amended Answer to O2 Micro International Limited's First Amended Counterclaim Document 286 Filed Aug. 3, 2006 total 12 pages.

Case No. 4:04-cv-02000-CW (consolidated with C 06-2929): *Monolithic Power Systems, Inc.* v. *O2 Micro International Ltd.*— Monolithic Power Systems, Inc.'s, Michael Hisng's, Advanced Semiconductor Manufacturing Company, Ltd.'s, Asustek Computer, Inc.'s, and Compal Electronics, Inc.'s (1) Motion for Summary Judgment, (2) Oppositeion to Motion for Summary Judgment, and (3) Claim Construction Brief Document 363-1 Filed Sep. 1, 2006 total 48 pages.

Case No. 4:04-cv-02000-CW (consolidated with C 06-2929): *Monolithic Power Systems, Inc.* v. *O2 Micro International Ltd.*—O2 Micro International Limited's (1) Reply in Support of Motion for Summary Judgment, (2) Reply Claim Construction Brief and (3) Oppositeion to Defendants' Motions for Summary Judgment Document 417 Filed Sep. 15, 2006 total 40 pages.

Case No. 4:04-cv-02000-CW (consolidated with C 06-2929): *Monolithic Power Systems, Inc.* v. *O2 Micro International Ltd.*— Monolithic Power Systems, Inc.'s, Michael Hisng's, Advanced Semiconductor Manufacturing Company, Ltd.'s, Asustek Computer, Inc.'s, and Compal Electronics, Inc.'s Reply Memorandum in Support of Motion for Summary Judgment Document 504 Filed Sep. 29, 2006 total 27 pages.

Case No. 4:04-cv-02000-CW (consolidated with C 06-2929): *Monolithic Power Systems, Inc.* v. *O2 Micro International Ltd.*—Order on Claim Construction and Cross-Motions for Summary Judgment Document 741 Filed Feb. 8, 2007 total 30 pages.

Case No. 4:04-cv-02000-CW (consolidated with C 06-2929): *Monolithic Power Systems, Inc.* v. *O2 Micro International Ltd.*— Monolithic Power Systems, ASMC, and Asustek's Motion for Leave to File a Motion for Reconsideration of Order Denying MPS' Motion for Summary Judgment of Invalidity of the '722 Patent and Denying Asustek's Motion for Summary Judgment Document 778 Filed Mar. 1, 2007 total: 10 pages.

Case No. 4:04-cv-02000-CW (consolidated with C 06-2929): *Monolithic Power Systems, Inc.* v. *O2 Micro International Ltd.*—Civil L.R. 7-9(B)(2) Motion for Reconsideration of Claim Construction Ruling and for Further Construction in View of New Intrinsic Evidence Submitted in Pending Reexamination Proceedings Document 804 Filed Mar. 15, 2007 total 13 pages.

Case No. 4:04-cv-02000-CW (consolidated with C 06-2929): *Monolithic Power Systems, Inc.* v. *O2 Micro International Ltd.*— Asustek'S Motion for Partial Reconsideration of Order Denying Its Motion for Summary Judgment Document 808 Filed Mar. 19, 2007 total 5 pages.

Case No. 4:04-cv-02000-CW (consolidated with C 06-2929): *Monolithic Power Systems, Inc.* v. *O2 Micro International Ltd.*—Reply in Support of Defendants' Motion for Reconsideration of Order on Claim Construction Document 818 Filed Mar. 27, 2007 total 19 pages.

Case No. 4:04-cv-02000-CW (consolidated with C 06-2929): *Monolithic Power Systems, Inc.* v. *O2 Micro International Ltd.*—Corrected Reply in Support of Defendants' Motion for Reconsideration of Order on Claim Construction Document 821 Filed Mar. 27, 2007 total 19 pages.

Case No. 4:04-cv-02000-CW (consolidated with C 06-2929): *Monolithic Power Systems, Inc.* v. *O2 Micro International Ltd.*—Reply to O2 Micro's Opposition to Asustek Computer, Inc.'s Motion for Partial Reconsideration of Order Denying Motion for Summary Judgment Document 824 Filed Mar. 28, 2007 total 8 pages.

Case No. 4:04-cv-02000-CW (consolidated with C 06-2929): *Monolithic Power Systems, Inc.* v. *O2 Micro International Ltd.*— Defendants' Monolithic Power Systems, ASMC, Asustek, Compal, and Michael Hisng's Discovery Designations Document 850 Filed Apr. 10, 2007 total 8 pages.

Case No. 4:04-cv-02000-CW (consolidated with C 06-2929): *Monolithic Power Systems, Inc.* v. *O2 Micro International Ltd.*—Joint Pretrial Conference Statement (Jury Trial) Document 857 Filed Apr. 10, 2007 total 41 pages.

Case No. 4:04-cv-02000-CW (consolidated with C 06-2929): *Monolithic Power Systems, Inc.* v. *O2 Micro International Ltd.*— Defendants' Motion for a Determination as a Matter of Law That O2 Micro Has No Evidence of the Required Nexus Between the Asserted Patent Claims and (1) The Commercial Success of Its Products, (2) Copying; or (3) Any Other Secondary Consideration of Non-Obviousness Document 998 Filed May 9, 2007 total 8 pages.

Case No. 4:04-cv-02000-CW (consolidated with C 06-2929): *Monolithic Power Systems, Inc.* v. *O2 Micro International Ltd.*— Defendants Monolithic Power Systems, ASMC, Asustek, Compal's Conditional Motion for Judgment as a Matter of Law of Invalidity Due to MPS's Prior Invention Date; Motion to Strike Testimony and Evidence Document 1002 Filed May 10, 2007 total 10 pages.

Case No. 4:04-cv-02000-CW (consolidated with C 06-2929): *Monolithic Power Systems, Inc.* v. *O2 Micro International Ltd.*—Motion for Judgment as a Matter of Law That the Asserted Claims of the '722 Patent Are Obvious Document 1009 Filed May 10, 2007 total 6 pages.

Case No. 4:04-cv-02000-CW (consolidated with C 06-2929): *Monolithic Power Systems, Inc.* v. *O2 Micro International Ltd.*—O2Micro International Limited's Proposed Construction of "Phase Overlap" Document 1015 Filed May 10, 2007 total 3 pages.

Case No. 4:04-cv-02000-CW (consolidated with C 06-2929): *Monolithic Power Systems, Inc.* v. *O2 Micro International Ltd.*— Defendants' Oppositeion to Motion to Preclude Reference to OZ Datasheets or Products as Prior Art Document 1033-1 Filed May 13, 2007 total 4 pages.

Case No. 4:04-cv-02000-CW (consolidated with C 06-2929): *Monolithic Power Systems, Inc.* v. *O2 Micro International Ltd.*—Verdict Form Document 1045 Filed May 15, 2007 total 5 pages.

Case No. 4:04-cv-02000-CW (consolidated with C 06-2929): *Monolithic Power Systems, Inc.* v. *O2 Micro International Ltd.*—Expert Report of Mark N. Horenstein, Ph.D., P.E. May 5, 2006 total 147 pages.

Case No. 4:04-cv-02000-CW (consolidated with C 06-2929): *Monolithic Power Systems, Inc.* v. *O2 Micro International Ltd.*—Expert Report of Jonathan R. Wood, May 5, 2006 total 78 pages.

Case No. 4:04-cv-02000-CW (consolidated with C 06-2929): *Monolithic Power Systems, Inc. v. O2 Micro International Ltd.*—Expert Report of Lawrence J. Goffney May 5, 2006 total 52 pages.
Case No. 4:04-cv-02000-CW (consolidated with C 06-2929): *Monolithic Power Systems, Inc. v. O2 Micro International Ltd.*—Expert Report of the Hornorable Gerald J. Mossinghoff, May 5, 2006 total 48 pages.
Case No. 4:04-cv-02000-CW (consolidated with C 06-2929): *Monolithic Power Systems, Inc. v. O2 Micro International Ltd.*—U.S. District Court Northern District of California Docket Sheet for Case #: 4:05-CV-2000 last entry date Jun. 25, 2007 total 185 pages.
Case No. 4:04-cv-02000-CW (consolidated with C 06-2929): *Monolithic Power Systems, Inc. v. O2 Micro International Ltd.*— Monolithic Power Systems, Inc.'s and Advanced Semiconductor Manufacturing Corporation Ltd.'s Supplemental Invalidity Contentions Apr. 5, 2006 total 296 pages.
Case No. 4:04-cv-02000-CW (consolidated with C 06-2929): *Monolithic Power Systems, Inc. v. O2 Micro International Ltd.*—MPS, Asustek, ASMC, and Compal's Disclosure Pursuant to 35 U.S.C§ 282 Mar. 30, 2007 total 14 pages.
Case No. 2:04-CV-359-TJW: *O2 Micro International Limited v. (1) Monolithic Power Systems, Inc.; (2) Compal Electronics, Inc.; (3) Compal Information (Kunshan) Co., Ltd.; (4) Compal Electronics Technology (Kunshan)-Co., Ltd., (5) Asustek Computer-Inc.; (6) Asustek Computer (Suzhou) Co., Ltd.; (7) Asustech (Suzhou) Co., Ltd.; (8) Advanced Semiconductor Manufacturing Corporation Limited Compal Electronics, Inc. v. Monolithic Power Systems, Inc.; Delta Electronics, Inc.; Delta Products Corporation*—Compal Electronics, Inc.'s First Amended Answer to Plaintiff's First Amended Complaint for Patent Infringement Document 53 Filed Aug. 29, 2005 total 21 pages.
Case No. 2:04CV-359-TJW: *O2 Micro International Limited v. (1) Monolithic Power Systems, Inc.; (2) Compal Electronics, Inc.; (3) Compal Information (Kunshan) Co., Ltd.; (4) Compal Electronics Technology (Kunshan) Co., Ltd., (5) Asustek Computer Inc.; (6) Asustek Computer (Suzhou) Co., Ltd.; (7) Asustech (Suzhou) Co., Ltd.; (8) Advanced Semiconductor Manufacturing Corporation Limited*—First Amended Cmoplaint for Patent Infringement Document 9-1 Filed Dec. 6, 2004 total 10 pages.
Case No. 2:04-CV-359-TJW: *O2 Micro International Limited v. Monolithic Power Systems, Inc.*—Monolithic Power Systems, Inc.'s Answer to First Amended Complaint; Counterclaims Document 12 Filed Dec. 13, 2004 total 17 pages.
Case No. 2:04-CV-359-TJW: *O2 Micro International Limited v. (1) Monolithic Power Systems, Inc.; (2) Compal Electronics, Inc.; (3) Compal Information (Kunshan) Co., Ltd.; (4) Compal Electronics Technology (Kunshan)-Co., Ltd., (5) Asustek Computer-Inc.; (6) Asustek Computer (Suzhou) Co., Ltd.; (7) Asustech (Suzhou) Co., Ltd.; (8) Advanced Semiconductor Manufacturing Corporation Limited Compal Electronics, Inc. v. Monolithic Power Systems, Inc.; Delta Electronics, Inc.; Delta Products Corporation*—Compal Electronics, Inc.'s First Amended Answer to Plaintiff's First Amended Complaint for Patent Infringement Document 53 Filed Aug. 29, 2005 total 21 pages.
Case No. 2:04-CV-359-TJW: *O2 Micro International Limited v. (1) Monolithic Power Systems, Inc.; (2) Compal Electronics, Inc.; (3) Compal Information (Kunshan) Co., Ltd.; (4) Compal Electronics Technology (Kunshan) Co., Ltd., (5) Asustek Computer Inc.; (6) Asustek Computer (Suzhou) Co., Ltd.; (7) Asustech (Suzhou) Co., Ltd.; (8) Advanced Semiconductor Manufacturing Corporation Limited; and (9) Michael Hisng*—Second Amended Complaint for Patent Infringement and Unfair Competition Document 112 Filed Nov. 18, 2005 total 12 pages.
Case No. 2:04-CV-359-TJW: *O2 Micro International Limited v. (1) Monolithic Power Systems, Inc.; (2) Compal Electronics, Inc.; (3) Compal Information (Kunshan) Co., Ltd.; (4) Compal Electronics Technology (Kunshan) Co., Ltd., (5) Asustek Computer Inc.; (6) Asustek Computer (Suzhou) Co., Ltd.; (7) Asustech (Suzhou) Co., Ltd.; (8) Advanced Semiconductor Manufacturing Corporation Limited; and (9) Michael Hisng Compal Electronics, Inc. v. Monolithic Power Systems, Inc., (10) Delta Electronics, Inc.; and (11) Delta Products Corporation*—Compal Electronics, Inc.,'s Answer to Plaintiff O2MICRO International Limited's Second Amended Complaint Document 117-1 Filed Dec. 2, 2005 total 19 pages.
Case No. 2:04-CV-359-TJW: *O2 Micro International Limited v. (1) Monolithic Power Systems, Inc.; (2) Compal Electronics, Inc.; (3) Compal Information (Kunshan) Co., Ltd.; (4) Compal Electronics Technology (Kunshan) Co., Ltd., (5) Asustek Computer Inc.; (6) Asustek Computer (Suzhou) Co., Ltd.; (7) Asustech (Suzhou) Co., Ltd.; and (8) Advanced Semiconductor Manufacturing Corporation Limited*—Joint Claim Construction and Prehearing Statement and Exhibit A-F Document 120 Filed Dec. 2, 2005 total 57 pages.
Case No. 2:04-CV-359-TJW: *O2 Micro International Limited v. Monolithic Power Systems, Inc. et al.,*—Monolithic Power Systems, Inc.'s Answer to Delta Electronics, Inc.'s Cross-Complaint, Counterclaim Against Delta Electronics, Inc., and Third Party Complaint Against O2 Micro International Limited Document 125 Filed Dec. 19, 2005 total 15 pages.
Case No. 2:04-CV-359-TJW: *O2 Micro International Limited v. Monolithic Power Systems, Inc. et al., Compal Electronics, Inc. v. Monolithic Power Systems, Inc.; Delta Electronics, Inc.; Delta Products Corporation Delta Electronics, Inc. v. Monolithic Power Systems, Inc. and Compal Electronics, Inc.,*—Monolithic Power Systems, Inc.'s Amended Answer to Delta Electronics, Inc.'s Cross-Complaint, Amended Counterclaim Against Delta Electronics, Inc. and Amended Third Party Complaint Against O2 Micro International Limited Document 139 Filed Jan. 9, 2006 total 16 pages.
Case No. 2:04-CV-359-TJW: *O2 Micro International Limited v. Monolithic Power Systems, Inc. et al.,*—Defendant Monolithic Power Systems, Inc.'s Answer to Second Amended Complaint; Counterclaims Document 144 Filed Jan. 9, 2006 total 23 pages.
Case No. 2:04-CV-359-TJW: *O2 Micro International Limited v. Monolithic Power Systems, Inc. et al.,*—Defendant Michael Hsing's Answer to Second Amended Complaint Document 145 Filed Jan. 9, 2006 total 11 pages.
Case No. 2:04CV-359-TJW: *O2 Micro International Limited v. Monolithic Power Systems, Inc. et al.,*—Defendants' Responsive Claim Construction Brief Document 149 Filed Jan. 17, 2006 total 38 pages.
Case No. 2:04-CV-359-TJW: *O2 Micro International Limited v. (1) Monolithic Power Systems, Inc.; (2) Compal Electronics, Inc.; (3) Compal Information (Kunshan) Co., Ltd.; (4) Compal Electronics Technology (Kunshan) Co., Ltd., (5) Asustek Computer Inc.; (6) Asustek Computer (Suzhou) Co., Ltd.; (7) Asustech (Suzhou) Co., Ltd.; (8) Advanced Semiconductor Manufacturing Corporation Limited*—Plaintiff O2 Micro International Limited's Reply Claim Construction Brief Document 163 Filed Jan. 26, 2006 total 38 pages.
Case No. 2:04-CV-359-TJW: *O2 Micro International Limited v. Monolithic Power Systems, Inc. et al.,*—Motion and Brief in Support of Asustek Computer, Inc.'s Motion for Summary Judgment Document 169 Filed Feb. 3, 2006 total 30 pages.
Case No. 2:04CV-359-TJW: *O2 Micro International Limited v. Monolithic Power Systems, Inc. et al.,*—Reply in Support of Asustek Computer, Inc.'s Motion for Summary Judgment Document 196 Filed Mar. 10, 2006 total 20 pages.
Case No. 2:04CV-359-TJW: *O2 Micro International Limited v. Monolithic Power Systems, Inc. et al.,*—Michael Hisng's Preliminary Invalidity Contentions and Monolithic Power Systems, Inc.'s, Asustek Computer Inc.'s, and Advanced Semiconductor Manufacturing Corporation Ltd.'s Supplemental Invalidity Contentions Mar. 31, 2006 total 31 pages.
Case No. 2:04CV-359-TJW: *O2 Micro International Limited v. Monolithic Power Systems, Inc. et al.,*—U.S. District Court Eastern District of Texas (Marshall) Civil Docket for Case #: 2:04-CV-00359-TJW last entry date: May 8, 2006 total 30 pages.
Case No. 2:04-CV-32-TJW: *O2 Micro International Limited v. (1) Beyond Innovation Technology Co., Ltd.; (2) SPI Electronic Co., Ltd.; (3) FSP Group and (4) Lien Chang Electronic Enterprise Co., Ltd.*— Complaint for Patent Infringement Document 1 Filed Jan. 30, 2004 total 6 pages.
Case No. 2:04-CV-32-TJW: *O2 Micro International Limited v. (1) Beyond Innovation Technology Co., Ltd.; (2) SPI Electronic Co., Ltd.; (3) FSP Group and (4) Lien Chang Electronic Enterprise Co., Ltd.*

*SPI Electronic Co. Ltd. v. O2 Micro International Limited*—SPI's Answer to Complaint and Counterclaims Document 6 Filed May 26, 2004 total 7 pages.
Case No. 2:04-CV-32-TJW: *O2 Micro International Limited v. Beyond Innovation Technology Co., Ltd.; SPI Electronic Co., Ltd.; FSP Group and Lien Chang Electronic Enterprise Co., Ltd. Beyond Innovation Technology Co., Ltd., and Lien Chang Electronic Enterprise Co., Ltd. v. O2 Micro Internal Limited*—Answer and Counterclaim of Defendants Beyond Innovation Technology Co., Ltd. and Lien Chang Electronic Enterprise Co., Ltd. Document 12 Filed Jul. 8, 2004 total 12 pages.
Case No. 2:04-CV-32-TJW: *O2 Micro International Limited v. Beyond Innovation Technology Co., Ltd.; SPI Electronic Co., Ltd.; FSP Group and Lien Chang Electronic Enterprise Co., Ltd. Beyond Innovation Technology Co., Ltd., SPI, and Lien Chang Electronic Enterprise Co., Ltd. v. O2 Micro Internal Limited*—First Amended Complaint for Patent Infringement Document 47 Filed Nov. 17, 2004 total 8 pages.
Case No. 2:04-CV-32-TJW: *O2 Micro International Limited v. Beyond Innovation Technology Co., Ltd.; SPI Electronic Co., Ltd.; FSP Group and Lien Chang Electronic Enterprise Co., Ltd.*—Answer to First Amended Complaint and Amended Counterclaims Document 49 Filed Dec. 2, 2004 total 14 pages.
Case No. 2:04-CV-32-TJW: *O2 Micro International Limited v. Beyond Innovation Technology Co., Ltd.; SPI Electronic Co., Ltd.; FSP Group and Lien Chang Electronic Enterprise Co., Ltd. Beyond Innovation Technology Co., Ltd., and Lien Chang Electronic Enterprise Co., Ltd. v. O2 Micro Internal Limited*—Answer to First Amended Complaint and Counterclaim of Defendant Beyond Innovation Technology Co., Ltd. Document 50 Filed Dec. 2, 2004 total 21 pages.
Case No. 2:04-CV-32-TJW: *O2 Micro International Limited v. Beyond Innovation Technology Co., Ltd.; SPI Electronic Co., Ltd.; FSP Group and Lien Chang Electronic Enterprise Co., Ltd. Beyond Innovation Technology Co., Ltd., and Lien Chang Electronic Enterprise Co., Ltd. v. O2 Micro Internal Limited*—Lien Chang's Answer to First Amended Complaint and Counterclaims Document 51 Filed Dec. 3, 2004 total 9 pages.
Case No. 2:04-CV-32-TJW: *O2 Micro International Limited v. Beyond Innovation Technology Co., Ltd.; SPI Electronic Co., Ltd.; FSP Group and Lien Chang Electronic Enterprise Co., Ltd. Beyond Innovation Technology Co., Ltd.; SPI Electronic Co., Ltd. and Lien Chang Electronic Enterprise Co., Ltd. v. O2 Micro Internal Limited*—O2 Micro International Limited's Opening Claim Construction Brief Document 102-1 Filed Apr. 25, 2005 total 21 pages.
Case No. 2:04-CV-32-TJW: *O2 Micro International Limited v. Beyond Innovation Technology Co., Ltd.; SPI Electronic Co., Ltd.; FSP Group and Lien Chang Electronic Enterprise Co., Ltd.*—SPI Electronic's Response Brief in Support of Its Proposed Claim Construction Document 105 Filed May 9, 2005 total 17 pages.
Case No. 2:04-CV-32-TJW: *O2 Micro International Limited v. Beyond Innovation Technology Co., Ltd.; SPI Electronic Co., Ltd.; FSP Group and Lien Chang Electronic Enterprise Co., Ltd.*—Defendant Beyond Innovation Technology Co., Ltd's Responsive Brief on Claim Construction Document 108-1 Filed May 10, 2005 total 17 pages.
Case No. 2:04-CV-32-TJW: *O2 Micro International Limited v. Beyond Innovation Technology Co., Ltd.; SPI Electronic Co., Ltd.; FSP Group and Lien Chang Electronic Enterprise Co., Ltd. Beyond Innovation Technology Co., Ltd.; SPI Electronic Co., Ltd. and Lien Chang Electronic Enterprise Co., Ltd. v. O2 Micro Internal Limited*—O2 Micro International Limited's Reply Claim Construction Brief Document 116 Filed Jun. 6, 2005 total 9 pages.
Case No. 2:04-CV-32-TJW: *O2 Micro International Limited v. Beyond Innovation Technology Co., Ltd.; SPI Electronic Co., Ltd.; FSP Group and Lien Chang Electronic Enterprise Co., Ltd.*—FSP Group's Answer to First Amended Complaint and Counterclaims Document 118 Filed Jul. 15, 2005 total 14 pages.
Case No. 2:04-CV-32-TJW: *O2 Micro International Limited v. Beyond Innovation Technology Co., Ltd et al.*—Order Document 129 Filed Aug. 26, 2005 total 2 pages.
Case No. 2:04-CV-32-TJW: *O2 Micro International Limited v. Beyond Innovation Technology Co., Ltd.; SPI Electronic Co., Ltd.; FSP Group and Lien Chang Electronic Enterprise Co., Ltd.*—Defendant Beyond Innovation Technology Co. Ltd.'s Motion for Summary Judgment of Invalidity Document 169 Filed Nov. 2, 2005 total p. 24.
Case No. 2:04-CV-32-TJW: *O2 Micro International Limited v. Beyond Innovation Technology Co., Ltd.; SPI Electronic Co., Ltd.; FSP Group and Lien Chang Electronic Enterprise Co., Ltd.*—Defendant Beyond Innovation Technology Co. Ltd.'s Motion for Summary Judgment of Unenforceablity Due to Inequitable Conduct Document 171 Filed Nov. 2, 2005 total 16 pages.
Case No. 2:04-CV-32-TJW: *O2 Micro International Limited v. Beyond Innovation Technology Co., Ltd.; SPI Electronic Co., Ltd.; FSP Group and Lien Chang Electronic Enterprise Co., Ltd.*—Defendant Beyond Innovation Technology Co. Ltd.'s Reply to O2 Micro International Ltd.'s Oppositeion to Bitek's Motion for Summary Judgment of Unenforceablity Due to Inequitable Conduct Document 220 Filed Nov. 23, 2005 total 7 pages.
Case No. 2:04-CV-32-TJW: *O2 Micro International Limited v. Beyond Innovation Technology Co., Ltd.; SPI Electronic Co., Ltd.; FSP Group and Lien Chang Electronic Enterprise Co., Ltd.*—Defendant Beyond Innovation Technology Co. Ltd.'s Reply to O2 Micro International Ltd.'s Oppositeion to Bitek's Motion for Summary Judgment of Invalidity Document 221 Filed Nov. 23, 2005 total 7 pages.
Case No. 2:04-CV-32-TJW: *O2 Micro International Limited v. Beyond Innovation Technology Co., Ltd.; SPI Electronic Co., Ltd.; FSP Group and Lien Chang Electronic Enterprise Co., Ltd.*—Second Amended Joint Final Pretrial Order Document 352 Filed May 9, 2006 total 54 pages.
Case No. 2:04-CV-32-TJW: *O2 Micro International Limited v. Beyond Innovation Technology Co., Ltd et al.*—Defendant Beyond Innovation Technology Co., Ltd.'s Supplemental Brief Regarding Inequitable Conduct Document 411 Filed Dec. 12, 2006 total 21 pages.
Case No. 2:04-CV-32-TJW: *O2 Micro International Limited v. Beyond Innovation Technology Co., Ltd.; SPI Electronic Co., Ltd.; FSP Group and Lien Chang Electronic Enterprise Co., Ltd.*—Defendant Beyond Innovation Technology Co. Ltd.'s Final Invalidity Contentions Filed Oct. 17, 2005 total 259 pages.
Case No. 2:04-CV-32-TJW: *O2 Micro International Limited v. Beyond Innovation Technology Co., Ltd.; SPI Electronic Co., Ltd.; FSP Group and Lien Chang Electronic Enterprise Co., Ltd.*—Expert Report of Dr. Praveen Jain Document 218 Filed Nov. 22, 2005 total 96 pages.
Case No. 2:04-CV-32-TJW: *O2 Micro International Limited v. Beyond Innovation Technology Co., Ltd.; SPI Electronic Co., Ltd.; FSP Group and Lien Chang Electronic Enterprise Co., Ltd.*—US District Court Eastern District of Texas (Marshall) Docket Sheet Case #: 2:04-CV-0032-TJW last entry date: Jul. 26, 2007 total 46 pages.
Case No. 2:04-cv-323-TJW: *O2 Micro International Limited v. Samsung Electronics Co., Ltd.*—Complaint for Patent Infringement Document 1-1 Filed Sep. 3, 2004 pp. 1-6.
Case No. 2:04-cv-323-TJW: *O2 Micro International Limited v. (1) Samsung Electronics Co., Ltd., (2) Samsung Electronics America, Inc., (3) Samsung SDI Co., Ltd., and (4) Samsung SDI America, Inc.*—First Amended Complaint for Patent Infringement Document 2-1 Filed Oct. 15, 2004 total 7 pages.
Case No. 2:04-cv-323-TJW: *O2 Micro International Limited v. Samsung Electronics Co., Ltd., Samsung Electronics America, Inc., Samsung SDI Co., Ltd., and Samsung SDI America, Inc.*—Defendants Samsung Electronics Co., Ltd. and Samsung Electronics America, Inc.'s Answer to Plaintiff's First Amended Complaint and Counterclaims Document 12 Filed Mar. 8, 2005 Total 11 pages.
Case No. 2:04-cv-323-TJW: *O2 Micro International Limited v. Samsung Electronics Co., Ltd., Samsung Electronics America, Inc., Samsung SDI Co., Ltd., and Samsung SDI America, Inc.*—Defendants Samsung SDI Co., Ltd. and Samsung SDI America, Inc.'s Answer to Plaintiff's First Amended Complaint, and Counterclaims Document 16 Filed Mar. 22, 2005 Total 11 pages.
Case No. 2:04-cv-323-TJW: *O2 Micro International Limited v. Samsung Electronics Co., Ltd., Samsung Electronics America, Inc., Samsung SDI Co., Ltd., and Samsung SDI America, Inc.*—Plaintiff O2 Micro International Limited's Opening Claim Construction Brief Document 57-1 Filed Feb. 17, 2006 Total 50 pages.

Case No. 2:04-cv-323-TJW: *O2 Micro International Limited* v. *Samsung Electronics Co., Ltd., and Samsung Electronics America, Inc.*—Samsung Electronics Co., Ltd. and Samsung Electronics America, Inc.'s Responsive Brief on Claim Construction Document 60-1 Filed Mar. 3, 2006 total 44 pages.

Case No. 2:04-cv-323-TJW: *O2 Micro International Limited* v. *Samsung Electronics Co., Ltd., Samsung Electronics America, Inc., Samsung SDI Co., Ltd., and Samsung SDI America, Inc.*—Plaintiff O2 Micro International Limited's Reply Brief on Claim Construction Document 63 Filed Mar. 17, 2006 total 26 pages.

Case No. 2:04-cv-323-TJW: *O2 Micro International Limited* v. *Samsung Electronics Co., Ltd., Samsung Electronics America, Inc., Samsung SDI Co., Ltd., and Samsung SDI America, Inc.*— Defendants Samsung Electronics Co., Ltd. and Samsung Electronics America, Inc.'s First Amended Answer Document 66 Filed Mar. 20, 2006 total 18 pages.

Case No. 2:04-cv-323-TJW: *O2 Micro International Limited* v. *Samsung Electronics Co., Ltd., et al*—Memorandum Opinion and Order Document 84 Filed Jun. 28, 2006 total 16 pages.

Case No. 2:04-cv-323-TJW: *O2 Micro International Limited* v. *Samsung Electronics Co., Ltd., and Samsung Electronics America, Inc.*—Defendants Samsung Electronics Co., Ltd. and Samsung Electronics America, Inc.'s Second Amended Answer Document 108 Filed Dec. 7, 2006 total 19 pages.

Case No. 2:04-cv-323-TJW: *O2 Micro International Limited* v. *Samsung Electronics Co., Ltd., and Samsung Electronics America, Inc.*—Defendants' Motion for Summary Judgment on Invalidity of Asserted Claims of U.S. Patent No. 6,707,264 Document 131 Filed Feb. 21, 2007 total 8 pages.

Case No. 2:04-cv-323-TJW: *O2 Micro International Limited* v. *Samsung Electronics Co., Ltd., and Samsung Electronics America, Inc.*—Defendants' Reply in Support of Their Motion for Summary Judgment of Invalidity of U.S. Patent No. 6,707,264 Document 169 Filed Mar. 16, 2007 total 3 pages.

Case No. 2:04-cv-323-TJW: *O2 Micro International Limited* v. *Samsung Electronics Co., Ltd., and Samsung Electronics America, Inc.*—Joint Final Pretrial Order Document 207 Filed Apr. 2, 2007 total 67 pages.

Case No. 2:04-cv-323-TJW: *O2 Micro International Limited* v. *Samsung Electronics Co., Ltd., and Samsung Electronics America, Inc.*—Defendants Samsung Electronics Co., Ltd. and Samsung Electronics America, Inc.'s Notice Under 35 U.S.C. § 282 Document 141 Filed Mar. 2, 2007 total 9 pages.

Case No. 2:04-cv-323-TJW: *O2 Micro International Limited* v. *Samsung Electronics Co., Ltd., and Samsung Electronics America, Inc.*—U.S. District Court [Live] Eastern District of Texas Live (Marshall) Civil Docket for Case #: 2:04-CV-00323-TJW last entry date Jul. 31, 2007 total 30 pages.

Case No. 2:05-CV-323-TJW: *O2 Micro International Limited* v. (1) *Hon Hai Precision Industry Co., Ltd. a/k/a Foxconn, and* (2) *Ambit Microsystems Corporation*—Complaint for Patent Infringement Document 1-1 Filed Jul. 18, 2005 total 6 pages.

Case No. 2:05-CV-323-TJW: *O2 Micro International Limited* v. *Hon Hai Precision Industry Co., Ltd. a/k/a Foxconn, and Ambit Microsystems Corporation*—Answer and Demand for Jury by Hon Hai Precision Industry Co., Ltd. a/k/a Foxconn Document 13 filed Sep. 23, 2005 total 8 pages.

Case No. 2:05-CV-323-TJW: *O2 Micro International Limited* v. *Hon Hai Precision Industry Co., Ltd. a/k/a Foxconn, and Ambit Microsystems Corporation*—First Amended Answer and Counterclaims by Hon Hai Precision Industry Co., Ltd. a/s/a Foxconn Document 30 Filed Feb. 3, 2006 total 19 pages.

Case No. 2:05-CV-323-TJW: *O2 Micro International Limited* v. *Hon Hai Precision Industry Co., Ltd. a/k/a Foxconn, and Ambit Microsystems Corporation*—Joint Claim Construction and Prehearing Statement and Exhibit A Document 82 Filed Oct. 26, 2006 total 44 pages.

Case No. 2:05-CV-323-TJW: *O2 Micro International Limited* v. *Hon Hai Precision Industry Co., Ltd. a/k/a Foxconn, and Ambit Microsystems Corporation*—Plaintiff O2 Micro International Limited's Opening Claim Construction Brief Document 83 Filed Nov. 16, 2006 total 8 pages.

Case No. 2:05-CV-323-TJW: *O2 Micro International Limited* v. *Hon Hai Precision Industry Co., Ltd. a/k/a Foxconn, and Ambit Microsystems Corporation*—Honhai's Claim Construction Brief Document 88 Filed Dec. 7, 2006 total 39 pages.

Case No. 2:05-CV-323-TJW: *O2 Micro International Limited* v. (1) *Hon Hai Precision Industry Co., Ltd. a/k/a Foxconn, and* (2) *Ambit Microsystems Corporation*—Plaintiff O2 Micro International Limited's Reply Claim Construction Brief Document 90 Filed Dec. 18, 2006 total 28 pages.

Case No. 2:05-CV-323-TJW-CE: *O2 Micro International Limited* v. *Hon Hai Precision Industry Co., Ltd. a/k/a Foxconn, and Ambit Microsystems Corporation*—Plaintiff O2 Micro International Limited's Response in Opposition to Second Supplement to Hon Hai's Claim Construction Brief Regarding the Reexamination of O2 Micro's '615 and '722 Patents Document 125 Filed Apr. 9, 2007 total 12 pages.

Case No. 2:05-CV-323-TJW-CE: *O2 Micro International Limited* v. *Hon Hai Precision Industry Co., Ltd. a/k/a Foxconn, and Ambit Microsystems Corporation*—Reply in Support of Hon Hai's Second Supplement to Its Claim Construction Brief Document 127 Filed Apr. 16, 2007 total 9 pages.

Case No. 2:05-CV-323-TJW-CE: *O2 Micro International Limited* v. *Hon Hai Precision Industry Co., Ltd. a/k/a Foxconn, and Ambit Microsystems Corporation*—Defendant Hon Hai Precision Industry Co., Ltd's Motion for Summary Judgment Document 134 Filed May 14, 2007 total 52 pages.

Case No. 2:05-CV-323-TJW-CE: *O2 Micro International Limited* v. *Hon Hai Precision Industry Co., Ltd. a/k/a Foxconn, and Ambit Microsystems Corporation*—Defendant Hon Hai Precision Industry Co., Ltd's Preliminary Invalidity Contentions Filed Mar. 28, 2006 total 33 pages.

Case No. 2:05-CV-323-TJW-CE: *O2 Micro International Limited* v. *Hon Hai Precision Industry Co., Ltd. a/k/a Foxconn, and Ambit Microsystems Corporation*—Hon Hai Precision Industry Co., Ltd.'s Updated Preliminary Invalidity Contentions Sep. 15, 2006 total 40 pages.

Case No. 2:05-CV-323-TJW-CE: *O2 Micro International Limited* v. *Hon Hai Precision Industry Co., Ltd. a/k/a Foxconn, and Ambit Microsystems Corporation*—U.S. District Court Eastern District of Texas (Marshall) Docket Sheet for Case #: 2:05-CV-323 last entry date Aug. 20, 2007 total 26 pages.

Case No. 4:06-CV-02929-CW: *O2 Micro International Limited* v. *Monolithic Power Systems, Inc.*—Advanced Semiconductor Manufacturing Corporation's Answer and Counterclaims to O2's Second Amended Complaint Document 4-1 Filed May 19, 2006 total 17 pages.

Case No. 4:06-CV-02929-CW: *O2 Micro International Limited* v. *Monolithic Power Systems, Inc.*—Asustek Compluter, Inc.'s Answer and Counterclaims to O2's Second Amended Complaint Document 6-1 Filed May 19, 2006 total 19 pages.

Case No. 4:06-CV-02929-CW: *O2 Micro International Limited* v. *Monolithic Power Systems, Inc., Asustek Computer, Inc., Michael Hisng, Compal Electronics Inc., Compal Information (Kunshan) Co., Ltd., Compal Electronics Technology (Kunshan) Co., Ltd., Asustek Computer (Suzhou) Co., Ltd., Advanced Semiconductor Manufacturing Corporation Limited a/k/a Advanced Semiconductor Manufacturing Corporation of Shanghai*—[Proposed] Third Amended Complaint for Patent Infringement and Unfair Competition; Demand for Jury Trial Document 39 Filed Jul. 26, 2006 total 10 pages.

Case No. 4:06-CV-02929-CW: *O2 Micro International Limited* v. *Monolithic Power Systems, Inc., et al.*—Compal Electronics, Inc.'s [Proposed] Answer to Plaintiff O2 Micro International Limited's Third Amended Complaint Document 41 Filed Jul. 28, 2006 total 22 pages.

Case No. 4:06-CV-02929-CW: *O2 Micro International Limited* v. *Monolithic Power Systems, Inc. et al.*—Asustek Computer, Inc.'s Answer and Counterclaims to O2's Micro's Third Amended Complaint Document 42 Filed Jul. 28, 2006 total 19 pages.

Case No. 4:06-CV-02929-CW: *O2 Micro International Limited* v. *Monolithic Power Systems, Inc. et al.*—Michael R. Hisng's Answer to O2 Micro's Thrid Amended Complaint Document 43 Filed Jul. 28, 2006 total 10 pages.

Case No. 4:06-CV-02929-CW: *O2 Micro International Limited* v. *Monolithic Power Systems, Inc. et al.*—Monolithic Power Systems, Inc.'s Answer and Counterclaims to O2 Micro's Third Amended Complaint Document 44 Filed Jul. 28, 2006 total 29 pages.

Case No. 4:06-CV-02929-CW: *O2 Micro International Limited* v. *Monolithic Power Systems, Inc. et al.*—Advanced Semiconductor Manufacturing Corporation's Answer and Counterclaims to O2's Third Amended Complaint Document 45 Filed Jul. 28, 2006 total 18 pages.

Case No. 4:06-CV-02929-CW: *O2 Micro International Limited* v. *Monolithic Power Systems, Inc. et al.*—Michael Hisng's Supplemental Invalidity Contentions and Monolithic Power Systems, Inc.'s, Asustek Computer Inc.'s, and Advanced Semiconductor Manufacturing Corporation Ltd.'s Second Supplemental Invalidity Contentions and Exhibits Filed Jul. 28, 2006 total 797 pages.

Case No. 4:06-CV-02929-CW: *O2 Micro International Limited* v. *Monolithic Power Systems, Inc. et al.*—Michael Hisng's Supplemental Invalidity Contentions and Monolithic Power Systems, Inc.'s, Asustek Computer Inc.'s, and Advanced Semiconductor Manufacturing Corporation Ltd.'s Second Supplemental Invalidity Contentions Aug. 7, 2006 total 33 pages.

Case No. 4:06-CV-02929-CW: *O2 Micro International Limited* v. *Monolithic Power Systems, Inc. et al.* Michael Hisng's, Monolithic Power Systems, Inc.'s, Asustek Computer Inc.'s and Advanced Semiconductor Manufacturing Corporation Ltd.'s Final Invalidity Contentions Aug. 24, 2006 total 30 pages.

Case No. 4:06-CV-02929-CW: *O2 Micro International Limited* v. *Monolithic Power Systems, Inc. et al.*—U.S. District Court California Northern District (Oakland) Civil Docket for Case #: 4:06-CV-02929-CW last entry date: Sep. 14, 2006 total 9 pages.

Case No. 2:03-CV-00007-TJW: *O2 Micro International Limited* v. (1) *Sumida Corporation and* (2) *Taiwan Sumida Electronics Inc.*—Complaint for Patent Infringement Document 1 Filed Jan. 6, 2003 total 47 pages.

Case No. 2:03-CV-00007-TJW: *O2 Micro International Limited* v. *Sumida Corporation and Taiwan Sumida Electronics Inc.*—Sumida Corporation and Taiwan Sumida Electronics, Inc. Answer to O2 Micro's Complaint Document 55 Filed Apr. 5, 2004 total 6 pages.

Case No. 2:03-CV-00007-TJW: *O2 Micro International Limited* v. *Taiwan Sumida Electronics Inc.*—O2 Micro International Limited's Opening Claim Construction Brief Document 90 Filed Dec. 1, 2004 total 33 pages.

Case No. 2:03-CV-00007-TJW: *O2 Micro International Limited* v. *Taiwan Sumida Electronics Inc.*—Joint Claim Construction and Prehearing Statement and Exhibit A Document 89-1 and 89-2 Filed Oct. 22, 2004 total 60 pages.

Case No. 2:03-CV-00007-TJW: *O2 Micro International Limited* v. (1) *Sumida Corporation and* (2) *Taiwan Sumida Electronics Inc.*—O2 Micro International Limited's Reply Claim Construction Brief Document 96 Filed Dec. 22, 2004 total 37 pages.

Case No. 2:03-CV-00007-TJW: *O2 Micro International Limited* v. *Sumida Corporation et al.*—Memorandum Opinion and Order Document 102 Filed Mar. 8, 2005 total 15 pages.

Case No. 2:03-CV-00007-TJW: *O2 Micro International Limited* v. *Taiwan Sumida Electronics Inc.*—Motion for Summary Judgment No. 3 (Invalidity of Claim 39 and 40) Document 125-1 Filed Apr. 27, 2005 total 7 pages.

Case No. 2:03-CV-00007-TJW: *O2 Micro International Limited* v. *Taiwan Sumida Electronics Inc.*—Joint Final Pretrial Order Document 178-1 Filed Aug. 23, 2005 total 30 pages.

Case No. 2:03-CV-00007-TJW: *O2 Micro International Limited* v. *Taiwan Sumida Electronics Inc.*—TSE's Amended Renewed Motion for Judgment as a Matter of Law Document 250 Filed Jan. 9, 2006 total 27 pages.

Case No. 2:03-CV-00007-TJW: *O2 Micro International Limited* v. *Taiwan Sumida Electronics Inc.*—TSE's Reply in Support of Amended Renewed Motion for Judgment as a Matter of Law Document 276 Filed Mar. 6, 2006 total 20 pages.

Case No. 2:03-CV-00007-TJW: *O2 Micro International Limited* v. *Taiwan Sumida Electronics Inc.*—Defendant Taiwan Sumida Electronics, Inc.'s Final Invalidity Contentions and Exhibits Filed May 2, 2005 total 166 pages.

Case No. 2:03-CV-00007-TJW: *O2 Micro International Limited* v. *Taiwan Sumida Electronics Inc.*—Expert Report of Clyde M. Brown Jr., P.E. Mar. 25, 2005 total 65 pages.

Case No. 2:03-CV-00007-TJW: *O2 Micro International Limited* v. *Taiwan Sumida Electronics Inc.*—U.S. District Court Estern District of Texas (Marshall) Civil Docket for Case #: 2:03-CV-00007-TJW last entry date Jul. 26, 2007 total 31 pages.

Case No. 2:03-CV-00007-TJW: *O2 Micro International Limited* v. *Taiwan Sumida Electronics Inc.*—Defendant Taiwan Sumida Electronics, Inc.'s Notice Under 35 U.S.C. §-282 May 3, 2005 total 6 pages.

Case No. 2:05-CV-00211-TJW: *O2 Micro International Limited* v. (1) *Rohm Co., Ltd.*, (2) *Sony Corporation* (3) *Sony EMCS Corporation* (4) *Sony Corporation of America and* (5) *Sony Electronics Inc.*—Complaint for Patent Infringement Document 1-1 Filed Jun. 3, 2005 total 7 pages.

Case No. 2:05-CV-00211-TJW: *O2 Micro International Limited* v. *Rohm Co., Ltd., Sony Corporation, Sony EMCS Corporation, Sony Corporation of America and Sony Electronics Inc.*—Defendant Rohm Co. Ltd.'s Answer and Counterclaims to Plaintiff's Complaint Document 38 Filed Feb. 15, 2006 total 10 pages.

Case No. 2:05-CV-00211-TJW: *O2 Micro International Limited* v. (1) *Rohm Co., Ltd.*, (2) *Sony Corporation* (3) *Sony EMCS Corporation* (4) *Sony Corporation of America and* (5) *Sony Electronics Inc.*—Sony Corporation, Sony EMCS Corporation, Sony Corporation of America and Sony Electronics Inc.'s Answer to O2 Micro's Complaint Document 41 Filed Feb. 16, 2006 total 29 pages.

Case No. 2:05-CV-00211-TJW: *O2 Micro International Limited* v. (1) *Rohm Co., Ltd.*, (2) *Sony Corporation* (3) *Sony EMCS Corporation* (4) *Sony Corporation of America and* (5) *Sony Electronics Inc.*—First Amended Complaint for Patent Infringement Document 84 Filed Dec. 11, 2006 total 9 pages.

Case No. 2:05-CV-00211-TJW: *O2 Micro International Limited* v. (1) *Rohm Co., Ltd.*, (2) *Sony Corporation* (3) *Sony EMCS Corporation* (4) *Sony Corporation of America and* (5) *Sony Electronics Inc.*—Rohm Co. Ltd.'s Answer to O2 Micro's First Amended Complaint for Patent Infringement, First Amended Defenses, and First Amended Counterclaims Document 89 Filed Jan. 5, 2007 total 71 pages.

Case No. 2:05-CV-00211-TJW: *O2 Micro International Limited* v. (1) *Rohm Co., Ltd.*, (2) *Sony Corporation* (3) *Sony EMCS Corporation* (4) *Sony Corporation of America and* (5) *Sony Electronics Inc.*—Sony Corporation, Sony EMCS Corporation, Sony Corporation of America and Sony Electronics Inc.'s Answer to O2 Micro's First Amended Complaint With Counterclaims Document 90 Filed Jan. 5, 2007 total 63 pages.

Case No. 2:05-CV-00211-TJW: *O2 Micro International Limited* v. (1) *Rohm Co., Ltd.*, (2) *Sony Corporation* (3) *Sony EMCS Corporation* (4) *Sony Corporation of America and* (5) *Sony Electronics Inc.*—Sony Corporation, Sony EMCS Corporation, Sony Corporation of America and Sony Electronics Inc.'s Answer to O2 Micro's First Amended Complaint and First Amended Counterclaims Document 100 Filed Jan. 30, 2007 total 62 pages.

Case No. 2:05-CV-00211-TJW: *O2 Micro International Limited* v. (1) *Rohm Co., Ltd.*, (2) *Sony Corporation* (3) *Sony EMCS Corporation* (4) *Sony Corporation of America and* (5) *Sony Electronics Inc.*—Rohm Co. Ltd.'s Amended Answer to O2 Micro's First Amended Complaint for Patent Infringement, First Amended Defenses, and Second Amended Counterclaims Document 102 Filed Feb. 1, 2007 total 71 pages.

Case No. 2:05-CV-00211-TJW-CE: *O2 Micro International Limited* v. *Rohm Co., Ltd., Sony Corporation, Sony EMCS Corporation, Sony Corporation of America and Sony Electronics Inc. Sony Corporation and Sony Electronics Inc.* v. *Microsemi Corporation*—Third-Party Defendant Microsemi Corporation's Answer to Sony Corporation and Sony Electronics Inc.'s Third-Party Complaint; and Microsemi Corporation's Claims Against Plaintiff O2 Micro International Ltd. Document 128 Filed Apr. 13, 2007 total 39 pages.

Case No. 2:05-CV-00211-TJW-CE: *O2 Micro International Limited v. Rohm Co., Ltd., Sony Corporation, Sony EMCS Corporation, Sony Corporation of America and Sony Electronics Inc. Sony Corporation and Sony Electronics Inc. v. Microsemi Corporation*—Microsemi Corporation's Reply to Counterclaims of O2 Micro International Limited and Demand for Jury Trial Document 139 Filed Jun. 1, 2007 total 14 pages.

Case No. 2:05-CV-00211-TJW-CE: *O2 Micro International Limited v. Rohm Co., Ltd., Sony Corporation, Sony EMCS Corporation, Sony Corporation of America and Sony Electronics Inc. Sony Corporation and Sony Electronics Inc. v. Microsemi Corporation*—Third-Party Defendant Microsemi Corporation's Answer to Sony Corporation and Sony Electronics Inc.'s Third-Party Complaint; and Microsemi Corporation's Amended Claims Against Plaintiff O2 Micro International Ltd. Document 160 Filed Jul. 9, 2007 total 51 pages.

Case No. 2:05-CV-00211-TJW-CE: (1) *O2 Micro International Limited v.* (1)*Rohm Co., Ltd.*, (2) *Sony Corporation*, (3) *Sony EMCS Corporation*, (4) *Sony Corporation of America and* (5) *Sony Electronics Inc.* (1) *Sony Corporation and* (2) *Sony Electronics Inc. v.* (1) *Microsemi Corporation*—Joint Claim Construction and Prehearing Statement Pursuant to Patent Rule 4-3 and Exhibit A-D Document 167 Filed Jul. 18, 2007 total 81 pages.

Case No. 2:05-CV-00211-TJW-CE: (1) *O2 Micro International Limited v.* (1)*Rohm Co., Ltd.*, (2) *Sony Corporation*, (3) *Sony EMCS Corporation*, (4) *Sony Corporation of America and* (5) *Sony Electronics Inc. v. Microsemi Corporation*—Plaintiff O2 Micro International Limited's Opening Claim Construction Brief Document 172 Filed Jul. 23, 2007 total 18 pages.

Case No. 2:05-CV-00211-TJW-CE: *O2 Micro International Limited v. Rohm Co., Ltd., Sony Corporation, Sony EMCS Corporation, Sony Corporation of America and Sony Electronics Inc. Sony Corporation and Sony Electronics Inc. v. Microsemi Corporation*—Rohm's Responsive Brief on Claim Construction Document 198 Filed Aug. 8, 2007 total 43 pages.

Case No. 2:05-CV-00211-TJW-CE: *O2 Micro International Limited v. Rohm Co., Ltd., Sony Corporation, Sony EMCS Corporation, Sony Corporation of America and Sony Electronics Inc. Sony Corporation and Sony Electronics Inc. v. Microsemi Corporation*—Microsemi Corporation's Responsive Brief on Claim Construction Document 199 Filed Aug. 8, 2007 total 53 pages.

Case No. 2:05-CV-00211-TJW-CE: (1) *O2 Micro International Limited v.* (1)*Rohm Co., Ltd.*, (2) *Sony Corporation*, (3) *Sony EMCS Corporation*, (4) *Sony Corporation of America and* (5) *Sony Electronics Inc. v. Microsemi Corporation*—Plaintiff O2 Micro International Limited's Reply Claim Construction Brief Document 209 Filed Aug. 13, 2007 total 30 pages.

Case No. 2:05-CV-00211-TJW-CE: *O2 Micro International Limited v. Rohm Co., Ltd., Sony Corporation, Sony EMCS Corporation, Sony Corporation of America and Sony Electronics Inc. Sony Corporation and Sony Electronics Inc. v. Microsemi Corporation*—Notice of Filing Joint Claim Construction Chart and Exhibit A-C Document 223 total 122 pages.

Case No. 2:05-CV-00211-TJW-CE: *O2 Micro International Limited v. Rohm Co., Ltd., Sony Corporation, Sony EMCS Corporation, Sony Corporation of America and Sony Electronics Inc. Sony Corporation and Sony Electronics Inc. v. Microsemi Corporation*—Rohm Co., Ltd.'s Invalidity Contentions total 18 pages.

Case No. 2:05-CV-00211-TJW-CE: *O2 Micro International Limited v. Rohm Co., Ltd., Sony Corporation, Sony EMCS Corporation, Sony Corporation of America and Sony Electronics Inc. Sony Corporation and Sony Electronics Inc. v. Microsemi Corporation*—U.S. District Court [Live] Eastern District of Texas Live (Marshall) Civil Docket for Case #: 2:05-CV-00211-TJW last entry date Aug. 24, 2007 total 29 pages.

Case No. 2:05-CV-00211-TJW-CE: *O2 Micro International Limited v. Rohm Co., Ltd., Sony Corporation, Sony EMCS Corporation, Sony Corporation of America and Sony Electronics Inc. Sony Corporation and Sony Electronics Inc. v. Microsemi Corporation*—Microsemi Corporations' Preliminary Invalidity Contentions Regarding U.S. Patent Nos. 6,804,129, 6,259,615 and 6,396,722 total 28 pages.

Case No. C04 02000: *Monolithic Power Systems, Inc. v. O2 Micro International Ltd.*—Defendants' Renewed Monions for Judgment as a Matter of Law and Conditional Motions for New Trial Document 1088 Filed Jul. 27, 2007 total 32 pages.

Case No. C04 02000: *Monolithic Power Systems, Inc. v. O2 Micro International Ltd.*—O2 Micro International Limited's Response to Counter-defendant Advanced Semiconductor Manufacturing Corporation Limited's First Set of Requests for Admission Filed Jun. 28, 2006 total 14 pages.

Case No. C04 02000: *Monolithic Power Systems, Inc. v. O2 Micro International Ltd.*—O2 Micro International Limited's Response to Monolithic Ower Systems, Inc.'s First Set of Requests for Admission Filed Jun. 28, 2006 total 45 pages.

Case No. C04 02000CW (C06-02929CW): *Monolithic Power Systems, Inc. v. O2 Micro International Ltd., and O2 Micro International Ltd. v. Monolithic Power Systems, Inc. et al.*—O2 Micro International Ltd.'s Responses and Objections to Monolithic Ower Systems, Inc., Advanced Semiconductor Manufacturing Corporation of Shanghai, Asustek Computer, Inc., and Michael Hisng's First Set of Request for Admissions (Nos. 1-11) Filed Aug. 18, 2006 total 8 pages.

Case No. C04 02000CW (C06-02929CW): *Monolithic Power Systems, Inc. v. O2 Micro International Ltd., and O2 Micro International Ltd. v. Monolithic Power Systems, Inc. et al.*—O2 Micro International Ltd.'s Responses to Counter-Defendant Advanced Semiconductor Manufacturing Corporation Limited's First Set of Requests for Admission Filed Aug. 28, 2006 total 19 pages.

Case No. C04 02000CW (C06-02929CW): *Monolithic Power Systems, Inc. v. O2 Micro International Ltd., and O2 Micro International Ltd. v. Monolithic Power Systems, Inc. et al.*—O2 Micro International Ltd.'s Responses and Objections to Monolithic Ower Systems, Inc.'s First Set of Requests for Admission (Nos. 1-154) Filed Aug. 28, 2006 total 53 pages.

Case No. C04 02000CW (C06-02929CW): *Monolithic Power Systems, Inc. v. O2 Micro International Ltd.,*—MPS's and Asustek's Opening Brief on Inequitable Conduct Document 1096 Filed Aug. 10, 2007 total 30 pages.

Case No. C04 02000CW (C06-02929CW): *Monolithic Power Systems, Inc. v. O2 Micro International Ltd.,*—Defendants' Reply in Support of Their Motions for Judgment as a Matter of Law or New Trial and Oppositeion to O2 Micro's Motions for Judgment as a Matter of Law or a New Trial Document 1108 Filed Aug. 17, 2007 total 68 pages.

Case No. C04 02000CW (C06-02929CW): *Monolithic Power Systems, Inc. v. O2 Micro International Ltd.,*—MPS and Asustek's Reply in Support of Their Inequitable Conduct Defense Document 1116 Filed Aug. 24, 2007 total 18 pages.

Case No. 2:04-CV-32-TJW: *O2 Micro International Limited v.* (1) *Beyond Innovation Technology Co., Ltd.*; (2) *SPI Electronic Co., Ltd.*; (3) *FSP Group and* (4) *Lien Chang Electronic Enterprise Co., Ltd.*—Joint Claim Construction and Prehearing Statement Document 94-1 to 94-6 Filed Mar. 21, 2005 total 42 pages.

Case No. 2:04-CV-32-TJW: *O2 Micro International Limited v.* (1) *Beyond Innovation Technology Co., Ltd.*; (2) *SPI Electronic Co., Ltd.*; (3) *FSP Group and* (4) *Lien Chang Electronic Enterprise Co., Ltd.*—O2 Micro's Responses and Objections to Bitek's First Set of Requests for Admission (Nos. 1-8) and Second Set of Interrogatories (No. 19) Filed Nov. 9, 2004 total 11 pages.

Case No. 2:04-CV-32-TJW: *O2 Micro International Limited v.* (1) *Beyond Innovation Technology Co., Ltd.*; (2) *SPI Electronic Co., Ltd.*; (3) *FSP Group and* (4) *Lien Chang Electronic Enterprise Co., Ltd.*—Transcript of Trial Date: May 15, 2006 total 51 pages.

Case No. 2:04-CV-32-TJW: *O2 Micro International Limited v.* (1) *Beyond Innovation Technology Co., Ltd., et al.*—Videotaped Deposition of Yung-Lin Lin Date Oct. 6, 2005 total 88 pages.

Case No. 2007-1302, 1303, 1304 United States Court of Appeals for the Federal Circuit *O2 Micro International Limited v. Beyond Innovation Technology Co., Ltd.; and FSP Group and SPI Electronic Co., Ltd.; and Lien Chang Electronic Enterprise Co., Ltd* Appeals from the United States District Court for the Eastern District of Texas in 2:04-CV-32 Hon. T. John Ward—Brief of Defendant—Appellant Beyond Innovation Technology Co., Ltd. Filed Jul. 16, 2007 total 101 pages.

Case No. 2007-1302, 1303, 1304 United States Court of Appeals for the Federal Circuit *O2 Micro International Limited v. Beyond Inno-* vation Technology Co., Ltd.; and FSP Group and SPI Electronic Co., Ltd.; and Lien Chang Electronic Enterprise Co., Ltd Appeals from the United States District Court for the Eastern District of Texas in 2:04-CV-32 Hon. T. John Ward—Opening Brief of Appellants FSP Grouop and SPI Electronic Co., Ltd (Now Named FSP Technology Inc.) Filed Jul. 16, 2007 total 75 pages.

Case No. 2007-1302, 1303, 1304 United States Court of Appeals for the Federal Circuit *O2 Micro International Limited* v. *Beyond Innovation Technology Co., Ltd.; and FSP Group and SPI Electronic Co., Ltd.; and Lien Chang Electronic Enterprise Co., Ltd* Appeals from the United States District Court for the Eastern District of Texas in 2:04-CV-32 Hon. T. John Ward—Principal Brief of Defendant-Appellant Lien Chang Electronic Enterprise Co., Ltd. Filed Jul. 16, 2007 total 66 pages.

Case No. 2:04-cv-323-TJW: *O2 Micro International Limited* v. *Samsung Electronics Co., Ltd.*—Joint Claim Construction and Pre-Hearing Statement in Complaince With PLR-4-3 Document 56-1 Filed Jan. 9, 2006 total 39 pages.

Case No. 2:04-cv-323-TJW: *O2 Micro International Limited* v. *Samsung Electronics Co., Ltd. and Samsung Electronics America, Inc.*—Defendants Samsung Electronics Co. Ltd. and Samsung Electronics America, Inc.'s Supplemental Preliminary Invalidity Contentions Filed Sep. 1, 2006 total 315 pages.

Case No. 2:04-cv-323-TJW: *O2 Micro International Limited* v. *Samsung Electronics Co., Ltd. and Samsung Electronics America, Inc.*—Deposition of Yung-Lin Lin vol. II Date: Jan. 30, 2007 total 120 pages.

Case No. 4:06-CV-02929-CW (C04-2000CW): *O2 Micro International Limited* v. *Monolithic Power Systems, Inc. and Monolithic Power Systems, Inc.* v. *O2 Micro International Limited*: Jury Trial Transcript of Proceedings Date: May 14, 2007 vol. 9 pp. 1528-1696 total 144 Pages.

Case No. 4:06-CV-02929-CW (C04-2000CW): *O2 Micro International Limited* v. *Monolithic Power Systems, Inc., et. al.*,—Michael Hisng's Supplemental Invalidity Contentions and Monolithic Power Systems, Inc.'s and Advanced Semiconductor Manufacturing Corporation Ltd.'s Second Supplemental Invalidity Contentions filed Aug. 7, 2006 total 524 pages.

Case No. 4:06-CV-02929-CW (C04-2000CW): *O2 Micro International Limited* v. *Monolithic Power Systems, Inc., et. al.*,—Michael Hisng's, Monolithic Power Systems, Inc.'s, Asustek Computer Inc. 's, and Advanced Semiconductor Manufacturing Corporation Ltd.'s Final Invalidity Contentions, Certificate of Service and MPS, Asustek, ASMC, and Compal's Disclosure Pursuant to 35 U.S.0 §282 and Exhibits Filed Aug. 24, 2007 total 539 pages.

Case No. 2:05-CV-0323 (TJW): *O2 Micro International Limited* v. *Hon Hai Precision Industry Co., Ltd. a/k/a Foxconn and Ambit Microsystems Corporation*—Hon Hai Precision Industry Co., Ltd.'s Updated Preliminary Invalidity Contentions and Exhibits Filed Sep. 15, 2006 total 853 pages.

Case No. 2:05-CV-0323 (TJW): *O2 Micro International Limited* v. *Hon Hai Precision Industry Co., Ltd. a/k/a Foxconn and Ambit Microsystems Corporation*—O2 Micro International Ltd.'s Objections and Responses to Defendant's First Set of Requests for Admissions Filed May 16, 2007 total 21 pages.

Case No. 2:05-CV-0323 : *O2 Micro International Limited* v. *Hon Hai Precision Industry Co., Ltd. et al.*—Order Document 165 Filed Jul. 31, 2007 total 1 page.

Case No. 2:05-CV-0323 (TJW): *O2 Micro International Limited* v. *Hon Hai Precision Industry Co., Ltd. a/k/a Foxconn and Ambit Microsystems Corporation*—Videotaped Deposition of Yung-Lin Lin Date: Mar. 23, 2007 total 108 pages.

Case No. 2:03-CV-00007-TJW: *O2 Micro International Limited* v. (1) *Sumida Corporation* and (2) *Taiwan Sumida Electronics Inc.*—Defendant Taiwan Sumida Electronics, Inc.'s Preliminary Invalidity Contentions filed Sep. 2, 2004 total 230 pages.

Case No. 2:03-CV-00007-TJW: *O2 Micro International Limited* v. (1) *Sumida Corporation* and (2) *Taiwan Sumida Electronics Inc.*—O2 Micro International Limited's Responses to Defendant Taiwan Sumida Electronics, Inc.'s First Set of Requests for Admissions Filed May 16, 2007 total 21 pages.

Case No. 2:03-CV-00007-TJW: *O2 Micro International Limited* v. (1) *Sumida Corporation* and (2) *Taiwan Sumida Electronics Inc.*—Transcript of Trial Date Nov. 16, 2005 total 120 pages.

Case No. 2006-1411, -1436: United States Court of Appeals for the Federal Circuit *O2 Micro International Limited* vs. *Taiwan Sumida Electronics, Inc.* Appeals from the United States District Court for the Eastern District of Texas in Case No. 2:03-CV-00007, Judge T. John Ward.—Appellant Taiwan Sumida Electronics, Inc.'s Reply Brief Filed Feb. 28, 2007 total 40 pages.

Case No. 2006-1411, -1436: United States Court of Appeals for the Federal Circuit *O2 Micro International Limited* vs. *Taiwan Sumida Electronics, Inc.* Appeals from the United States District Court for the Eastern District of Texas in Case No. 2:03-CV-00007, Judge T. John Ward.—Brief for Defendant-Appellant Filed: Oct. 3, 2006 total 129 pages.

Case No. 2:05-CV-00211-TJW: *O2 Micro International Limited* v. (1) *Rohm Co., Ltd.*, (2) *Sony Corporation* (3) *Sony EMCS Corporation* (4) *Sony Corporation of America* and (5) *Sony Electronics Inc.*—Rohm Co., Ltd.'s Invalidity Contentions Date Jul. 2, 2007 total 397 pages.

Case No. 2:05-CV-00211-TJW: *O2 Micro International Limited* v. (1) *Rohm Co., Ltd.*, (2) *Sony Corporation* (3) *Sony EMCS Corporation* (4) *Sony Corporation of America* and (5) *Sony Electronics Inc. Sony Corporation and Sony Electronics Inc.* v. *Microsemi Corporation*—Microsemi Corporations' Preliminary Invalidity Contentions Regarding U.S. Patent Nos. 6,804,129, 6,259,615 and 6,396,722 Filed Jul. 2, 2007 total 1278 pages.

Case No. C04 02000: *Monolithic Power Systems, Inc.* v. *O2 Micro International Ltd.*—Trial Exhibit "Development of the Versatile Electronic Ballast for Metal Halide Lamps With Phase-Shift Soft-Switching Control" by C.L. Tsay et, al. pp. MPS '129001108 to MPS '129 001115 total 8 pages.

Nalbant—Phase Modulated PWM Topology With the ML4818, Micro Linear Application Note 42026 Date: Jun. 1996 total 16 pages.

Inventor: Nagai—Projector Device Patent Abstracts of Japan Publication No. 05-113604 Date of publication: May 7, 1993 total 20 pages.

Inventor: Koda, Takashima—Lighting Device Patent Abstract of Japan Publication No. 64-014895 Date of publication: Jan. 19, 1989 total 15 pages.

Inventor: Koda, Takashima—Lighting Apparatus European Patent Application Publication No. 0298934A1 Date of publication: Nov. 1, 1989 total: 14 pages.

Inventor: Takehara Cold-Cathode Tube Lighting Apparatus Using Piezoelectric Transformer, Patent Abstract of Japan Publication No. 08-138876 Publication Date: May 31, 1996 total 25 pages.

Inventor: Ishikawa, Tanaka, Hirata—Retrieving Device Patent Abstract of Japan Publication No. 04-085672 Date of Publication: Mar. 18, 1992 total 1 page.

Inventor Nishimura, Kouoka—Solid-Liquid Recovery Device Patent Abstract of Japan Publication No. 06-050297 Date of Publication Date: Feb. 22, 1994 total 16 pages.

T.H. Yu et al.,—Comparisons Among Self-Excited Parallel Resonant, Series Resonant and Current-Fed Push-Pull Electronic Ballasts, IEEE 1994 (MPS trial exhibit '129 000914-000920) total 7 pages.

Product Highlights—DC/AC Inverter Improves Lighting Efficiency, Electronic Products Apr. 1996 total 1 page.

Raab—Analysis of Idealized Class-D Power Amplifiers, Green Mountain Radio Research Company, 1982 total 21 pages.

Roddam—Transistor Inverters and Converters, Iliffe Books Ltd.,1963 MPS trial exhibit MPS'722000191-197 total 7 pages.

LMX1597-01 Preliminary Data Sheet Linfinity Microelectronics May 1996 (MPS trial exhibit MPS '722 000205-209) total 5 pages.

Linfinity Brochure Referencing Lin Doc. #1596-98, 1997 (MPS trial exhibit MPS ' 722 000203-204) total 2 pages.

Lin—Resonant Inverters and Their Applications to Electronic Ballasts and High Voltage Power Conversions University of Arizona 1996 total 246 pages.

English Translation of JP Office Action 2005-140410.

Case No. SACV 04-1174 CJC (ANx) *Microsemi Corporation* Plaintiff v. *Monolithis Power Systems, Inc.*, Defendant Declaration of Charles Coles, Filed by Defendant/Counterclaimant Monolithic Power Systems, Inc. in Support of its Motion for Summary Judgement of Invalidity of Asserted Claims of U.S. Patent No. 6,198,234—60pgs.

Society for Infomration Display, International Symposium, Digest of Technical Papers vol. XXIX, Anaheim Convention Center Anaheim, CA. May 17-22, 1998 Coles, Late-News Paper—7pgs.

Charles Coles, Application Engineer, Micro Linear Corporation "Single Stage CCFL Backlight Resonant Inverter Using PWM Dimming Methods" 4 pgs.

EDN Web Printout-Integrated Circuits: Mar. 1, 1996 4pgs.

File History of Henry, 5,930,121 total 408 pgs.

MP1010 Application Note Jan. 1, 2000 "MP1010 Resonant Mode CCFL Inverter" Monolithic Power Systems Inc. 23 Pgs.

MP1010 Monolithic Power Systems, Inc. "Cold Cathode Fluorescent Lamp Driver" Aug. 2000 Rev 1.3 total 5 pgs.

MP1010 Monolithic Power Systems, Inc. "Cold Cathode Fluorescent Lamp Driver" Preliminary Data Sheet V.2 Feb. 1999 6pgs.

MP1010 Monolithic Power Systems, Inc. "Cold Cathode Fluorescent Lamp Driver" Version 1.0 Jul. 1999 5pgs.

MP1010 Monolithic Power Systems, Inc. "Cold Cathode Fluorescent Lamp Driver" Version 1.2 Oct. 1999 5pgs.

MP1010 Monolithic Power Systems, Inc. "Cold Cathode Fluorescent Lamp Driver" Version 1.1 Sep. 1999 5pgs.

MP1011, Monolithic Power Systems, Inc. "Cold Cathode Fluorescent Lamp Driver" Preliminary Data Sheet Oct. 1999 5pgs.

Case No. SACV 04-1174 CJC (ANx) *Microsemi Corporation* Plaintiff v. *Monolithic Power Systems, Inc.* Defendant Declaration of Doyle Slack, Filed by Defendant/Counterclaimant Monolithic Power Systems, Inc., in support of its Motion for Summary Judgment of Invalidity of Asserted Claims of U.S. Patent No. 6,198,234 49pgs.

UCC1972/3, UCC2972/3, UCC3972/3 Unitrode "BiCMOS Cold Cathode Fluorescent Lamp Driver Controller" Jan. 2000 17 pgs.

UCC1972/3, UCC2972/3, UCC3972/3 Unitrode "BiCMOS Cold Cathode Fluorescent Lamp Driver Controller" Oct. 1998 revised Nov. 2000 17 pgs.

UCC2975, UCC2976, UCC2977,UCC3975, UCC3976, UCC3977 Texas Instruments "Multi-Topology Piezoelectric Transformer Controller" Jan. 2002 30 pgs.

Jim Williams, A Fourth Generation of LCD Backlight Technology, Linear Technology, Nov. 1995, Application Note 65.

ML4878 Feb. 1997 Micro Linear "ML4878 LCD Backlight Lamp Driver" 14 pgs.

ML4878 Oct. 1998 Micro Linear "Single Stage LCD Backlight Lamp Driver" 17 pgs.

ML Application Note 68, May 1998 "ML4878 Single-Stage CCFL Backlight Resonant Inverter" 12 pgs.

ML1010 AN-01, May 1999 "Designing CCFL Inverters with the MP1010" 7 pgs.

ML1010 AN-01, May 1999 "Designing CCFL Inverters with the MP1010" 6 pgs Version.11.

Micro Linear, Application Note 19, "Phase Modulated PWM Topology with the ML4818", By Mehmet K. Nalbant 16 pages.

"Resonant Inverters and Their Application to Electronics Ballasts and High Voltage Power Conversions" By Yung Lin Lin A Dissertation Submitted to the Faculty of the Department of Electrical and Computer Engineering. In Partial Fulfillment of the Requirements for the degree of Doctor of Philosophy in the Graduate College The University of Arizona 1996—243 Pages.

Product Innovations DC-to-AC Inverter Ups CCFL Lumens Per Watt Frank Goodenough Reprinted from Electronic Design Jul. 10, 1995 4 pgs.

Development of the Versatile Electronic Ballast for Metal Halide Lamps with Phase-Shift Soft-Switching Control, C.L. Tsay, H.S. Chun, L.M. Wu, K.S. Kwan Energy & Resources Laboratories Industrial Technology Research Institute Chutung Hisnschu Taiwan R.O.C. 0-7803-3544-9/96 $5.00 1996 IEEE pp. 2112-2119.

"Phase Shift Resonant Controller." Application Note US1879, UC2879, UC3879, Unitrode Corp., Jun. 1998: 1-6.

"Zero-Voltage Switching Techniques in DC/DC Converters", Kwang-Hwa Liu and Fred C, Lee, from Recent Developments in Resonant Power Conversion, Intertec Communications, Inc., 1988 pp. 211-223.

"A Comparative Study of Half-Bridge Resonant Converter Topologies", Robert L. Steigerld, Apr. 1998 (Cited Only).

"A Resonant Inverter for Electronic Ballast Applications", Melvin C. Cosby, Aug. 1994.

Preliminary Data sheet for MP1010 MPS 003586-3591, MPS Feb. 1999.

EV0014-5 W MP1011A CCFL Inverter (Rev 1.2 on Aug. 12, 2002) (Cited Only).

EV0001B-MP1015 Full System CCFL Inverter Module (Rev 1.2 on Dec. 10, 2002) (Cited Only).

Japanese Office Action Data Nov. 2, 2004 with English Translation (Cited Only).

Case Nos. CV-00-4071 CW and CV-1-3995 CW, *O2 Micro International Limited* (Plaintiff) v. *Monolithic Power Systems, Inc.* (Defendant and Counterclaimant), Monolithic Power Systems' Motion for Summary Judgement on the '615 Patent, Aug. 29, 2003 (Cited Only).

Case Nos. CV-00-4071 CW (EDL) and C-01-3995 CW, *O2 Micro International Limited* (Plaintiff) v. *Monolithic Power Systems, Inc.* (Defendant and Counterclaimant), Moyer Decl. In Support of Motion for Summay Judgement on the '615 patnet, Aug. 29, 2003 (Cited Only).

Case Nos. CV-00-407 (CW) (EDL) and CV-01-3995 (CW), *O2 Micro International Limited* (Plaintiff) v. *Monolithic Power Systems' inc.* (Defendant and Counterclaimant), Lin Decl. in Opp to Monolithic Power System Mot. Re. Non infringement of the '615 Patent, Aug. 29, 2003 (Cited Only).

Case Nos. CV-00-4071 CW and CV 01 3995 CW, *O2 Micro International Limited* (Plaintiff) v. *Monolithic Power Systems, Inc.* (Defendant and Counterclaimant), Monolithic Power Systems' Reply ISO SJM on '615 Patent Aug. 29, 2003 (Cited Only).

Case Nos. CV-00-4071 CW and CV 01 3995 CW, *O2 Micro International Limited* (Plaintiff) v. *Monolithic Power Systems, Inc.* (Defendant and Counterclaimant), Monolithic Power Systems' Objections to Erickson and Lin Declarations, Aug. 29, 2003 (Cited Only).

Case Nos. CV-00-4071 CW and CV 01 3995 CW, *O2 Micro International Limited* (Plaintiff) v. *Monolithic Power Systems, Inc.* (Defendant and Counterclaimant),Supp. Barclay Dell. ISO Motion for Summary Judgement on the '615 Patent, Aug. 29, 2003 (Cited Only).

Sam Sung Electronics Co., Ltd. Preliminary Specification, Doc. No. LT121SS-105, Rev. No. 04-00-g-981130, pp. 1-23, Nov. 30, 1998.

LG Philips LCD, Preliminary Specification, "6.4 VGA TFT LCD", Model No. LB064V02-A1, Liquid Crystal Display Ver. 1.3. pp. 1-27, May 20, 2003.

EV0002-Complete 2-Watt ust Mode MP1022A CCFL Driver Board (Rev 1.2 on Aug. 12, 2002) (Cited Only).

EV0004-MP0125 CCFL PDS Inverter Module (Rev. 2.0 on Aug. 12, 2002 (Cited Only).

MP1011A-Cold Cathode Fluorescent Lamp Driver (Rev 2.1 on Aug. 11, 2002).

MP1015-Full System Precision CCFL Driver (Rev 2.7 on Mar. 25, 2003).

MP1022A-CCFL Driver for Handheld Applications (Rev 1.6 on Aug. 11, 2002).

MP1025-CCFL Driver for Handheld Application (Rev 2.0 on Aug. 11, 2002.

MP1251/MP1252-SMBus Voltage Source (Rev Mar. 6, 2003) (Cited Only).

MP1254-SMBus Voltage Source in 3x3 QFN Package (Rev 1.0 on Mar. 25, 2003) (Cited Only).

AN-01-Resonant Mode CCFL Inverters (Rev 1.4 on Aug. 11, 2002).

LG Philips LCD, Preliminary Specification, "6.4 VGA TFT LCD", Model No. LP104V2-A1C1, Liquid Crystal Display Ver. 0.0. pp. 1-25, Aug. 31, 2001.

Bi-Search International, Inc., Preliminary Specification, "6.4 VGA TFT LCD", Model No. BLP104V2-LE, Liquid Crystal Display pp. 1-19, Jan. 1999.

LG Philips LCD Preliminary Specification, "10.4 VGS TFT LCD", Model No. LC104S1-A1, Liquid Crystal Display Ver. 1.0 pp. 1-28, Jan. 30, 2002.

LG Philips LCD Preliminary Specification, "12.1 SVGA TFT LCD", Model No. LC121S1-A1MT, Liquid Crystal Display, Ver. 1.3 pp. 1-26, Jan. 30, 2001.

Wiley Electrical and Electronics Engineering Dictionary, p. 832, 2004 (Cited Only).

Definition of Transformer retrieved from www.wordig.com on Nov. 17, 2004, pp. 1-11 (Cited Only).

Handbook of Standardized Terminolgy for the Power Sourced Industry, Power Sources Manufacturers Association, Iambda Electronics, Appendix C, "A Guide to World Primary Power Voltages and Frequencies (Single Phase)", 1987, First Edition (Cited Only).

Maxim Integrated Products, "High-Efficiency, Wide Brightness Rages, CCFL Backlight Controller", 19-2267, Rev. 1, Oct. 2002, pp. 1-28, 2002.

"Lamps and Lighting", Fourth Edition Edited by J.R. Coaton and A.M. Marsden, pp. 322-324, Arnold a member of the Hodder Headline Group, 1997.

Case No. 2-04-CV-369 LED, *O2 Micrio International Limited* (Plaintiff) v. *Monolithic Power Systems, Inc., et al.* (Defendants), Monolithic Power Systems, Inc's Answer to First Ameneded Compaint: Counterclaims, Dec. 13, 2004, 17 pages.

*O2 Micro International Limited* v. *Monolitic Power Systems, Inc.* U.S. Distric Eactern District of Texas (Marshall) Civil Docket for Case # 2:04-cv-00359-TJW Date Filed Oct. 13, 2004.

U.S. District Court [LIVE]Eastern District of Texas LIVE (Marshall) Civil Docket for Case # 2:04-cv-00323-TJW Date Filed Sep. 3, 2004.

*O2Micro International* v. (1) Hon Hai Precision Industry Co., Ltd, a/k/a Foxconn (2) Ambit Microsystems Corporation U.S. District Court Eastern Distict of Texas (Marshall) Case No# 2:05-cv-323 date filed Jul. 18, 2005.

U.S. District Court [LIVE]Eastern District of Texas LIVE (Marshall) Civil Docket for Case No# 2:05-cv-00211-TJW date filed Jun. 3, 2005.

U.S. Distict Court Eastern District of Texas LIVE (Marshall) Civil Docket for Case No# 2:03-cv-00007-TJW date filed Jan. 6, 2003. Docket Text and date filed 1 page.

*O2Micro International* v. *BiTek, SPI, FSP, Lien-Chang* U.S. District eastern District of Texas (Marshall) Case # 2:04-cv-0032-TJW Date Filed Jan. 30, 2004 updated on Feb. 1, 2007.

U.S. District Court California Northern District (Oakland) Civil Docket for Case # 4:06-cv-02929-CW Date Filed May 1, 2006 Related Case: 4:04-cv-2000-CW.

*Monolithic Power Systems Inc* v. *O2 Micro International* U.S. Distict Court Northern District of California Case # 4"04-cv-2000 Date Filed May 20, 2004.

*O2Micro International* v. *BiTek, SPI, FSP, Lien-Chang* U.S. District eastern District of Texas (Marshall) Case # 2:04-cv-0032-TJW Date Filed Jan. 30, 2004 updated on Dec. 25, 2006.

U.S. Distict Court [LIVE] Eastern District of Texas LIVE (Marshall) Civil Docket for Case# 2:04-cv-00323-TJW Date Filed Sep. 3, 2004 Updated on Dec. 25, 2006.

United States District Court Northern District of California Oakland Division Case No. C 04-2000 CW )Lead Case) Case No. C 06-02929 O2 Micro International Limited's Response and Objections to Monolithic Power Systems, Inc's First Set of Requests for Admission (Nos. 1-154).

LT1070 Design Manual, Application Notes 19, Jun. 1986, Carl Nelson 80pgs.

* cited by examiner

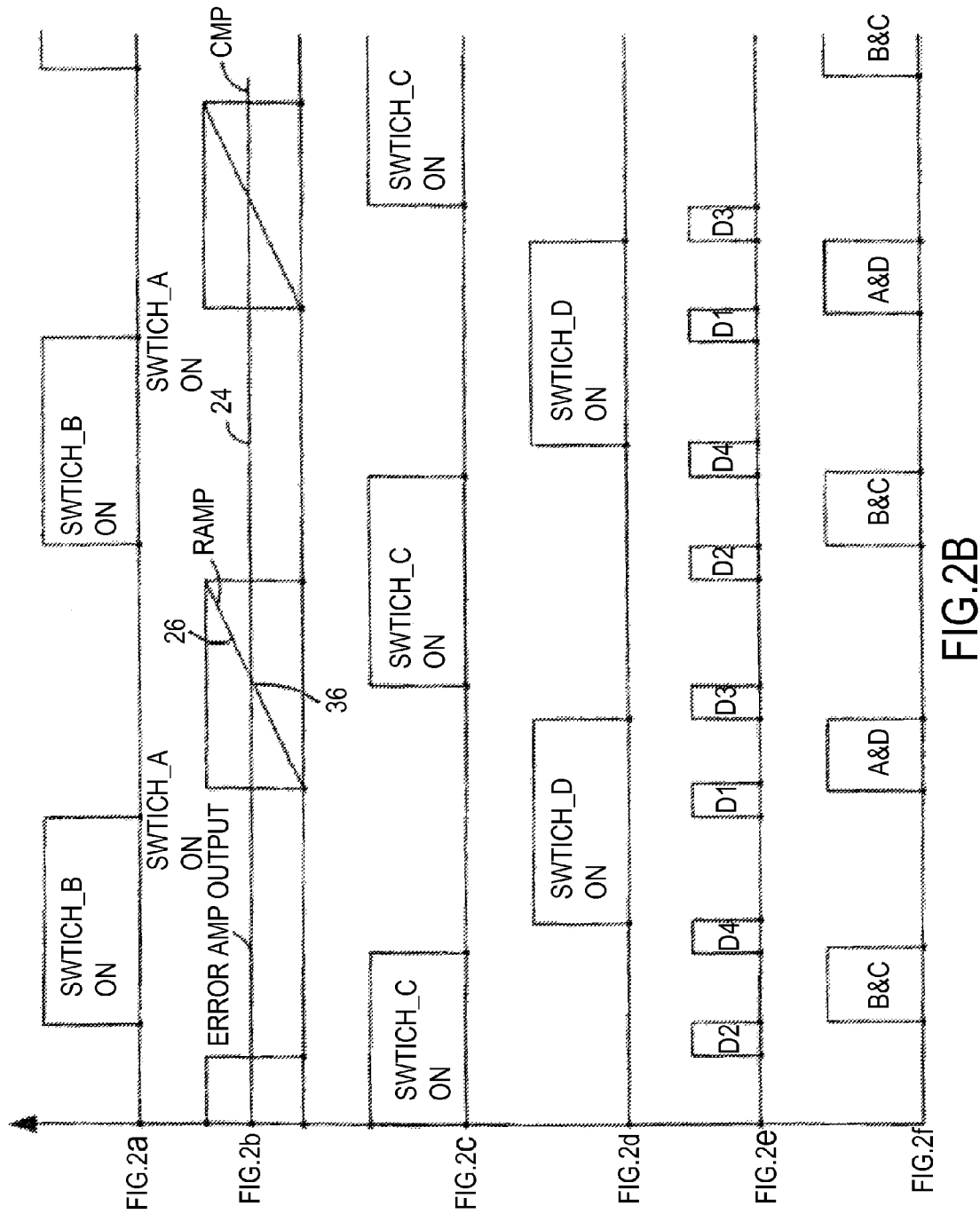

DC/AC COLD CATHODE FLUORESCENT LAMP INVERTER

CROSS REFERENCE TO RELATED UNITED STATES PATENT APPLICATIONS

This application is a Continuation application of the co-pending, commonly-owned U.S. patent application Ser. No. 10/935,629, filed Sep. 7, 2004, by Yung-Ling Lin, and entitled "High-Efficiency DC/AC Converter", which itself is a Continuation application of the commonly-owned U.S. patent application Ser. No. 10/776,417, filed Feb. 11, 2004, now U.S. Pat. No. 6,804,129, which itself is a Continuation application of the commonly owned U.S. patent application Ser. No. 10/132,016, filed Apr. 24, 2002, which itself is a Continuation application of the commonly-owned U.S. patent application Ser. No. 09/850,222, filed May 7, 2001, now U.S. Pat. No. 6,396,722, which itself is a Continuation application of the commonly-owned U.S. patent application Ser. No. 09/437,081, filed Nov. 9, 1999, now U.S. Pat. No. 6,259,615, all of which claim priority to the Provisional Application Ser. No. 60/145,118, filed Jul. 22, 1999, all of which are incorporated herein by reference.

FIELD OF THE INVENTION

The present invention is directed to a DC to AC power converter circuit. More particularly, the present invention provides a high efficiency controller circuit that regulates power delivered to a load using a zero-voltage-switching technique. General utility for the present invention is found as a circuit for driving one or more Cold Cathode Fluorescent Lamps (CCFLs), however, those skilled in the art will recognize that the present invention can be utilized with any load where high efficiency and precise power control is required.

DESCRIPTION OF RELATED ART

FIG. 1 depicts a conventional CCFL power supply system 10. The system broadly includes a power supply 12, a CCFL driving circuit 16, a controller 14, a feedback loop 18, and one or more lamps CCFL associated with an LCD panel 20. Power supply 12 supplies a DC voltage to circuit 16, and is controlled by controller 14, through transistor Q3. Circuit 16 is a self-resonating circuit, known as a Royer circuit. Essentially, circuit 16 is a self-oscillating dc to ac converter, whose resonant frequency is set by L1 and C1, and N1-N4 designate transformer windings and number of turns of the windings. In operation, transistors Q1 and Q2 alternately conduct and switch the input voltage across windings N1 and N2, respectively. If Q1 is conducting, the input voltage is placed across winding N1. Voltages with corresponding polarity will be placed across the other windings. The induced voltage in N4 makes the base of Q2 positive, and Q1 conducts with very little voltage drop between the collector and emitter. The induced voltage at N4 also holds Q2 at cutoff. Q1 conducts until the flux in the core of TX1 reaches saturation.

Upon saturation, the collector of Q1 rises rapidly (to a value determined by the base circuit), and the induced voltages in the transformer decrease rapidly. Q1 is pulled further out of saturation, and $V_{CE}$ rises, causing the voltage across N1 to further decrease. The loss in base drive causes Q1 to turn off, which in turn causes the flux in the core to fall back slightly and induces a current in N4 to turn on Q2. The induced voltage in N4 keeps Q1 conducting in saturation until the core saturates in the opposite direction, and a similar reversed operation takes place to complete the switching cycle.

Although the inverter circuit 16 is composed of relatively few components, its proper operation depends on complex interactions of nonlinearities of the transistors and the transformer. In addition, variations in C1, Q1 and Q2 (typically, 35% tolerance) do not permit the circuit 16 to be adapted for parallel transformer arrangements, since any duplication of the circuit 16 will produce additional, undesirable operating frequencies, which may resonate at certain harmonics. When applied to a CCFL load, this circuit produces a "beat" effect in the CCFLs, which is both noticeable and undesirable. Even if the tolerances are closely matched, because circuit 16 operates in self-resonant mode, the beat effects cannot be removed, as any duplication of the circuit will have its own unique operating frequency.

Some other driving systems can be found in U.S. Pat. Nos. 5,430,641; 5,619,402; 5,615,093; 5,818,172. Each of these references suffers from low efficiency, two-stage power conversion, variable-frequency operation, and/or load dependence. Additionally, when the load includes CCFL(s) and assemblies, parasitic capacitances are introduced, which affects the impedance of the CCFL itself. In order to effectively design a circuit for proper operation, the circuit must be designed to include consideration of the parasitic impedances for driving the CCFL load. Such efforts are not only time-consuming and expensive, but it is also difficult to yield an optimal converter design when dealing with various loads. Therefore, there is a need to overcome these drawbacks and provide a circuit solution that features high efficiency, reliable ignition of CCFLs, load-independent power regulation and single frequency power conversion.

SUMMARY

Embodiments in accordance with the present invention provide a DC to AC cold cathode fluorescent lamp inverter circuit, which includes a step-up transformer with a primary winding and a secondary winding for providing increased voltage to a cold cathode fluorescent lamp, a first MOSFET switch coupled to the step-up transformer for selectively allowing direct current of a first polarity to flow through the step-up transformer, and a second MOSFET switch coupled to the step-up transformer for selectively allowing direct current of a second polarity to flow through the step-up transformer. The primary winding and the secondary winding of the step-up transformer are electrically coupled to ground. The DC to AC cold cathode fluorescent lamp inverter circuit further includes a capacitor divider electrically coupled to the cold cathode fluorescent lamp for providing a first voltage signal representing a voltage across the cold cathode fluorescent lamp, a first feedback signal line coupled to the capacitor divider for receiving the first voltage signal from the capacitor divider. The DC to AC cold cathode fluorescent lamp inverter circuit further includes a timer circuit coupled to the first feedback signal line for providing a time-out sequence of a predetermined duration when the first voltage signal exceeds a predetermined threshold, and a protection circuit coupled to the timer circuit, the first switch and the second switch for shutting down the first switch and the second switch when the first voltage signal exceeds the predetermined threshold after the predetermined duration.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

FIG. 2a-FIG. 2f are exemplary timing diagrams of the circuit of FIG. 2;

FIG. 3a-FIG. 3f are exemplary timing diagrams of the circuit of FIG. 3; and

DETAILED DESCRIPTION

Figure 1:
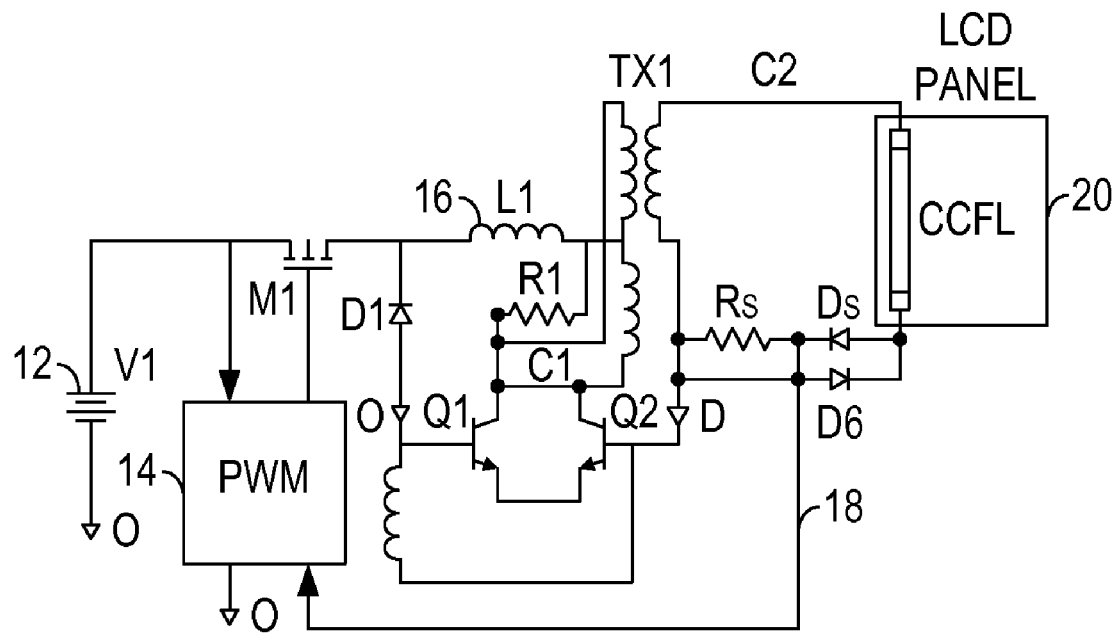
FIG. 1 is a conventional DC/AC converter circuit.

It will be appreciated by those skilled in the art that although the following detailed description will proceed with reference being made to embodiments and methods of use, the present invention is not intended to be limited to these embodiments and methods of use. Rather, the present invention is of broad scope and is intended to be limited as only set forth in the accompanying claims. While not wishing to be bound by example, the following detailed description will proceed with reference to a CCFL panel as the load for the circuit of the present invention. However, it will be apparent that the present invention is not limited only to driving one or CCFLs, rather, the present invention should be broadly construed as a power converter circuit and methodology independent of the particular load for a particular application.

Accordingly, embodiments in accordance with the present invention provide a improved system for driving a load and obtain a improved operation for various LCD panel loads, thereby the reliability of the system can be enhanced.

In one embodiment, a DC/AC converter circuit for controllably delivering power to a load, includes an input voltage source, a first plurality of overlapping switches and a second plurality of overlapping switches selectively coupled to the voltage source. The first plurality of overlapping switches define a first conduction path, and the second plurality of overlapping switches define a second conduction path. A pulse generator is provided to generate a pulse signal. Drive circuitry receives the pulse signal and controls the conduction state of the first and second plurality of switches. The DC/AC converter circuit also includes a transformer includes a transformer having a primary side and a secondary side. The primary side is selectively coupled to the voltage source in an alternating fashion through the first conduction path and, alternately, through the second conduction path. A load is coupled to the secondary side of the transformer. A feedback loop circuit is provided between the load and the drive circuitry and supplies a feedback signal indicative of power being supplied to the load. The drive circuitry alternates the conduction state of the first and second plurality of switches, and controls the overlap time of the switches in the first plurality of switches and the overlap time of the switches in the second plurality of switches, in order to couple the voltage source to the primary side based at least in part on the feedback signal and the pulse signal.

The drive circuitry is constructed to generate a first complimentary pulse signal from the pulse signal, and a ramp signal from the pulse signal. The pulse signal is supplied to a first one of the first plurality of switches to control the conduction state thereof, and the ramp signal is compared with at least the feedback signal to generate a second pulse signal. A controllable conduction overlap condition exists between the conduction states of the first and second switches of the first plurality of switches. The second pulse signal is supplied to a second one of the first plurality of switches to control the conduction state thereof. The drive circuitry further generates a second complimentary pulse signal based on the second pulse signal. The first and second complimentary pulse signals control the conduction states of a first switch and a second switch of the second of the second plurality of switches, respectively. Likewise, a controllable conduction overlap condition exists between the conduction states of the first and second switches of the second plurality of switches.

The present invention also provides a method for controlling a zero-voltage switching circuit to deliver power to a load. In one embodiment, the method includes supplying a DC voltage source, coupling a first and a second transistors defining a first conduction path and a third and a fourth transistors defining a second conduction path to the voltage source and a primary side of a transformer, generating a pulse signal having a predetermined pulse width, coupling a load to a secondary side of the transformer, generating a feedback signal from the load, and controlling the feedback signal and the pulse signal to determine the conduction states of the first, second, third and fourth transistors.

In the first embodiment, the present invention provides a converter circuit for delivering power to a CCFL load, which includes a voltage source, a transformer having a primary side and a secondary side, a first pair of switches and a second pair of switches defining a first and second conduction path, respectively, between the voltage source and the primary side, a CCFL load circuit coupled to the secondary side, a pulse generator generating a pulse signal, a feedback circuit coupled to the load for generating a feedback signal, and drive circuitry for receiving the pulse signal and the feedback signal and coupling the first pair of switches or the second pair of switches to the voltage source and the source and the primary side based on the pulse signal and the feedback signal to deliver power to the CCFL load.

Additionally, the first embodiment provides a pulse generator that generates a pulse signal having a predetermined frequency. The drive circuitry includes the first, second, third and fourth drive circuits. The first pair of switches includes the first and second transistors, and the second pair of switches includes the third and fourth transistors. The first, second, third and fourth drive circuits are connected to the control lines of the first, second, third and fourth transistors, respectively. The pulse signal is supplied to the first drive circuit so that the first transistor is switched in accordance with the pulse signal. The third drive circuit generates a first complimentary pulse signal and a ramp signal based on the pulse signal, and supplies the first complimentary pulse signal to the third transistor so that the third transistor is switched in accordance with the first complimentary pulse signal. The ramp signal and the feedback signal are compared to generate a second pulse signal. The second pulse signal is supplied to the second drive circuit so that the second transistor is switched in accordance with the second pulse signal. The forth driving circuit generates a second complementary pulse signal based on the second pulse signal and supplies the second complementary pulse signal to the fourth transistor so that the fourth transistor is switched in accordance with the second complimentary pulse signal. In one embodiment, the simultaneous conduction of the first and second transistors, and the simultaneous conduction of the third and fourth transistors, respectively, controls the amount of power delivered to the load. The pulse signal and the second pulse signal are generated to overlap by a controlled amount, thus delivering power to the load along the first conduction path. Since the first and second complementary pulse signals are generated from the pulse signal and second pulse signal respectively, the first and second complementary pulse signals are also generated to overlap by a controlled amount to deliver power to the load along the second conduction path. As such, power is delivered to the load in an alternating fashion between the first and second conduction paths.

Also, the pulse signal and first complementary pulse signal are generated to be approximately 180° out of phase, and the second pulse signal and the second complementary signal are generated to be approximately 180° out of phase, so that a short circuit condition between the first and second conduction paths can be avoided.

In addition to the converter circuit provided in the first embodiment, the second embodiment includes a flip-flop circuit coupled to the second pulse signal, which triggers the second pulse signal to the second drive signal only when the third transistor is switched into a conducting state. Additionally, the second embodiment includes a phase-lock loop (PLL) circuit having a first input signal from the primary side and a second input signal using the feedback signal. The PLL circuit compares the phase difference between these two signals and supplies a control signal to the pulse generator to control the pulse width of the pulse signal based on the phase difference between the first and second inputs.

In both embodiments, the converter circuit includes the feedback control loop having a first comparator for comparing a reference signal with the feedback signal and producing a first output signal. A second comparator is provided for comparing the first output signal with the ramp signal and producing the second pulse signal based on the intersection of the first output signal and the ramp signal. The feedback circuit can also include a current sense circuit receiving the feedback signal and generating a trigger signal, and a switch circuit between the first and second comparator. The switch circuit receives the trigger signal and generates either the first output signal or a predetermined minimum signal, based on the value of the trigger signal. The reference signal can include, for example, a signal that is manually generated to indicate a desires power to be delivered to the load. The predetermined minimum voltage signal can include a programmed minimum voltage supplied to the switches, so that an over-voltage condition does not appear across the load.

Likewise, in both embodiments described herein, an over-current protection circuit that receives the feedback signal and controls the pulse generator based on the value of said feedback signal can be included. An over-voltage protection can be provided to receive a voltage signal from across the load and the first output signal and compare the voltage signal from across the load and the first output signal, to control the pulse generator based on the value of the voltage signal from across the load.

As an overview, the present invention provides circuitry to controllably deliver power to a load using feedback signals and pulse signals to adjust the ON time of two pairs of switches. When one pair of switches are controllably turned ON such that their ON times overlap, power is delivered to a load (via a transformer), along a conduction path defined by the pair of switches. Likewise, when the other pair of switches are controllably turned ON such that their ON times overlap, power is delivered to a load (via a transformer), along a conduction path defined by other pair of switches. Thus, by selectively turning ON switches and controlling the overlap between-switches, the present invention can control power delivered to a given load in a relatively precise way. Additionally, the present invention includes over-current and over-voltage protection circuits, which discontinues power to the load in the event of a short circuit or open circuit condition. Moreover, the controlled switching topology described herein enables the circuit to operate irrespective of the load, and with a single operating frequency independent of the resonant effects of the transformer arrangement. These features are discussed below with reference to the drawings.

Figure 2:
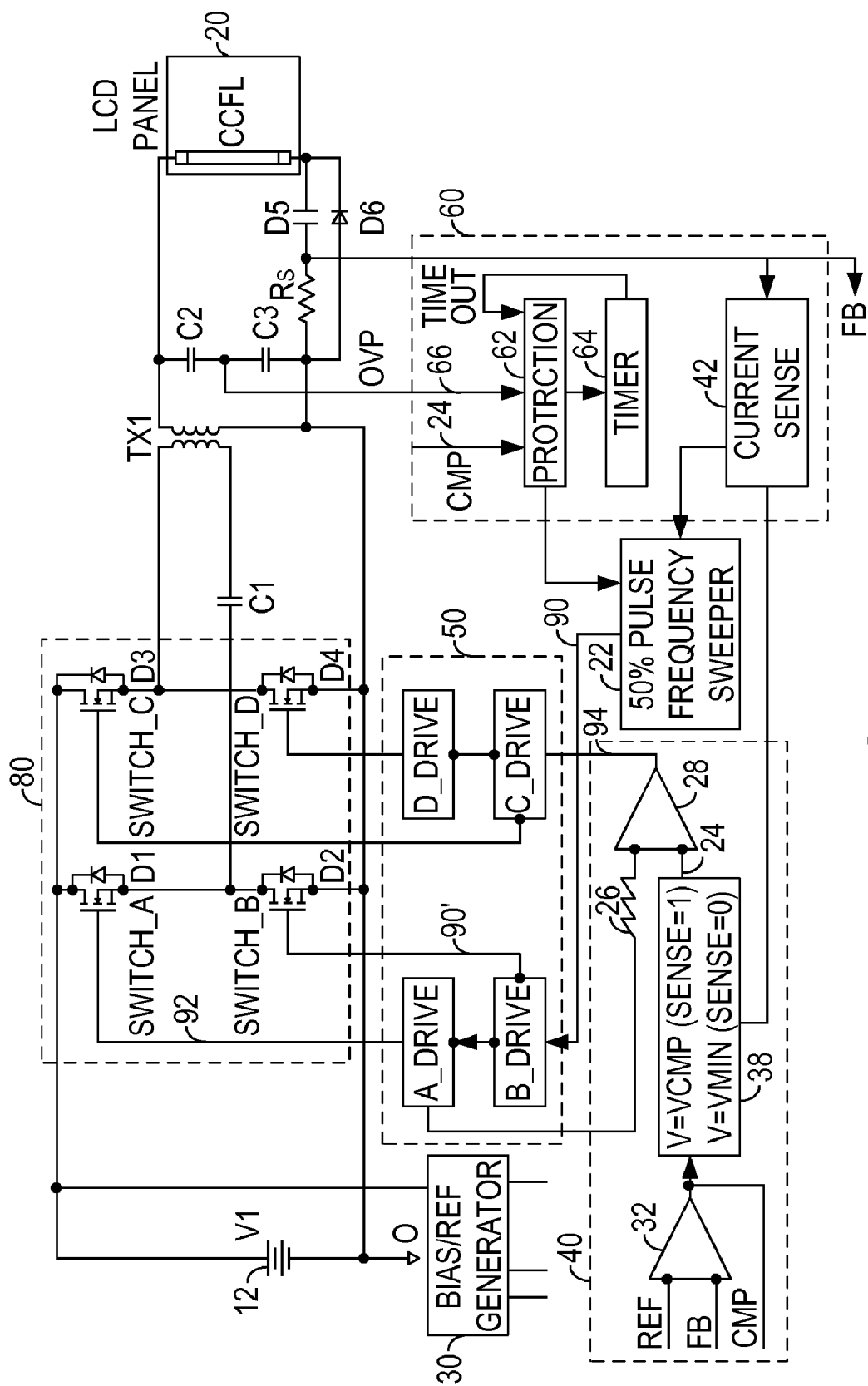
FIG. 2 is one embodiment of a DC/AC converter circuit of the present invention.

The circuit diagram shown in FIG. 2 illustrates one embodiment of a phase-shift, full-bridge, zero-voltage-switching power converter of the present invention. Essentially, the circuit shown in FIG. 2 includes a power source 12, a plurality of switches 80 arranged as diagonal pairs of switches defining alternating conduction paths, drive circuitry 50 for driving each of the switches, a frequency sweeper 22 which generates a square wave pulse to the drive circuitry 50, a transformer TX1 (with an associated resonant tank circuit defined by the primary side of TX1 and C1) and a load. Advantageously, the present invention also includes an overlap feedback control loop 40 which controls the ON time of at least one of each pair of switches, thereby permitting controllable power to be delivered to the load.

A power source 12 is applied to the system. Initially, a bias/reference signal 30 is generated for the control circuitry (in control loop 40) from the supply. For example, a frequency sweeper 22 generates a 50% duty-cycle pulse signal, starting with an upper frequency and sweeping downwards at a pre-determined rate and at pre-determined steps (i.e., square wave signal of variable pulse width). The frequency sweeper 22 can be a programmable frequency generator, as is known in the art. The pulse signal 90 (from the sweeper 22) is delivered to B_Drive (which drives the Switch_B, i.e., controls the gate of Switch_B), and is delivered to A_Drive, which generates a complementary pulse signal 92 and a ramp signal 26. The complementary pulse signal 92 is approximately 180° out of phase with pulse signal 90, and the ramp signal 26 is approximately 90° out of phase with pulse signal, as will be described below. The ramp signal can be a sawtooth signal, as shown in the Figure. The ramp signal 26 is compared with the output signal 24 (referred to herein as CMP) of the error amplifier 32, through comparator 28, thus generating signal 94. The output signal 94 of the comparator 28 is likewise a 50% duty pulse delivered to C_Drive to initiate the turning on of Switch_C which, in turn, determines the amount of overlap between the switches B and C, and switches A and D. Its complementary signal (phased approximately 180°) is applied to Switch_D, via D_Drive. It will be understood by those skilled in the art that circuits Drive_A-Drive_D are connected to the control lines (e.g., gate) of Switch_A-Switch_D, respectively, which permits each of the switches to controllably conduct, as described herein. By adjusting the amount of overlap between switches B, C and A, D, lamp-current regulation is achieved. In other words, it is the amount of overlapping in the conduction state of the pairs of switches that determines the amount of power processed in the converter. Hence, switches B and C, and switches A and D, will be referred to herein as overlapping switches.

While not wishing to be bound by example, in this embodiment, B_Drive can be formed of a totem pole circuit, generic low-impedance op-amp circuit, or emitter follower circuit. C_Drive is likewise constructed. Since both A-Drive and D_Drive are not directly connected to ground (i.e., floating), in one embodiment, these drives are formed of a boot-strap circuit, or other high-side drive circuitry known in the art. Additionally, as stated above, A_Drive and D_Drive include an inverter to invert (i.e., phase) the signal flowing from B_Drive and C_Drive, respectively.

High-efficiency operation is achieved through a zero-voltage-switching technique. The four MOSFETs (Switch_A-Switch_D) 80 are turned on after their intrinsic diodes (D1-D4) conduct, which provides a current flowing path of energy in the transformer/capacitor (TX1/C1) arrangement, thereby ensuring that a zero voltage is across the switches when they are turned on. With this controlled operation, switching loss is minimized and high efficiency is maintained.

The switching operation of the overlapping switches 80 is shown with reference to the timing diagrams of FIG. 2a-FIG. 2f. Switch_C is turned off at certain period of the conduction of both switches B and C (FIG. 2f). The current flowing in the tank (refer to FIG. 2) is now flowing through diode D4 (FIG. 2e) in Switch_D, the primary of transformer, C1, and Switch_B, after Switch_C is turned off, thereby resonating the voltage and current in capacitor C1 and the transformer as a result of the energy delivered when switches B and C were conducting (FIG. 2f). Note that this condition must occur, since an instantaneous change in current direction of the primary side of the transformer would violate Faraday's Law. Thus, current must flow through D4 when Switch_C turns off. Switch_D is turned on after D4 has conducted. Similarly, Switch_B is turned off (FIG. 2a), the current diverts to Diode D1 associated with Switch_A before Switch_A is turned on (FIG. 2e). Likewise, Switch_D is turned off (FIG. 2d), and the current is now flowing now from Switch_A, through C1, the transformer primary and Diode D3. Switch_C is turned on after D3 has conducted (FIG. 2e). Switch_B is turned on after Switch_A is turned off which allows the diode D2 to conduct first before it is turned on. Note that the overlap of turn-on time of the diagonal switches B,C and A,D determines the energy delivered to the transformer, as shown in FIG. 2f.

In this embodiment, FIG. 2b shows that the ramp signal 26 is generated only when Switch_A is turned on. Accordingly, Drive_A, which generates the ramp signal 26, can include a constant current generator circuit (not shown) that includes a capacitor having an appropriate time constant to create the ramp signal. To this end, a reference current (not shown) is utilized to charge the capacitor, and the capacitor is grounded (via, for example a transistor switch) so that the discharge rate exceeds the charge rate, thus generating the sawtooth ramp signal 26. Of course, as noted above, this can be accomplished by integrating the pulse signal 90, and thus, the ramp signal 26 can be formed using an integrator circuit (e.g., op-amp and capacitor).

In the ignition period, a pre-determined minimum overlap between the two diagonal switches is generated (i.e., between switches A,D and B,C). This gives a minimum energy from the input to the tank circuit including C1, transformer, C2, C3 and the CCFL load. Note that the load can be resistive and/or capacitive. The drive frequency starts at a predetermined upper frequency until it approaches the resonant frequency of the tank circuit and equivalent circuit reflected by the secondary side of the transformer, a significant amount of energy is delivered to the load where the CCFL is connected. Due to its high-impedance characteristics characteristics before ignition, the CCFL is subjected to high voltage from the energy supplied to the primary side. This voltage is sufficient to ignite the CCFL. The CCFL impedance decreases to its normal operating value (e.g., about 100 Kohm to 130 Kohm), and the energy supplied to the primary side based on the minimum-overlap operation is no longer sufficient to sustain a steady state operation of the CCFL. The output of the error amplifier 26 starts its regulating function to increase the overlap. It is the level of the error amplifier output determines the amount of the overlap.

Referring to FIG. 2b and FIG. 2c and the feedback loop 40 of FIG. 2, it is important to note that Switch_C is turned on when the ramp signal 26 (generated by Drive_A) is equal to the value of signal CMP 24 (generated by error amplifier 32), determined in comparator 28. This is indicated as the intersection point 36 in FIG. 2b. To prevent a short circuit, switches A,B and C,D must never be ON simultaneously. By controlling the CMP level, the overlap time between switches A,D and B,C regulates the energy delivered to the transformer. To adjust the energy delivered to the transformer (and thereby adjust the energy delivered to the CCFL load), switches C and D are time-shifted with respect to switches A and B, by controlling the error amplifier output, CMP 24. As can be understood by the timing diagrams, if the driving pulses from the output of comparator 28 into switches C and D are shifted to the right by increasing the level of CMP, an increase in the overlap between switches A,C and B,D is realized, thus increasing the energy delivered to the transformer. In practice, this corresponds to the to the higher-lamp current operation. Conversely, shifting the driving pulses of switches C and D to the left (by decreasing the CMP signal) decreases the energy delivered.

To this end, error amplifier 32 compares the feedback signal FB with a reference voltage REF. FB is a measure of the current value through the sense resistor Rs, which is indicative of the total current through the load 20. REF is a signal indicative of the desired load conditions, e.g., the desired current to flow through the load. During normal operation, REF=FB. If, however, load conditions are intentionally offset, for example, from a dimmer switch associated with an LCD panel display, the value of REF will increase/decrease accordingly. The compared value generates CMP accordingly. The value of CMP is reflective of the load conditions and/or an intentional bias, and is realized as the difference between REF and FB (i.e., REF-FB).

To protect the load and circuit from an open circuit condition at the load (e.g., open CCFL lamp condition during normal operation), the FB signal can also be compared to a reference value (not shown and different from the REF signal described above) at the current sense comparator 42, the output of which defines the condition of switch 28, discussed below. This reference value can be programmable, and/or user-definable, and reflects the minimum or maximum current permitted by the system (for example, as may be rated for the individual components, and, in particular, the CCFL load). If the value of the feedback FB signal and the reference signal is within a permitted range (normal operation), the output of the current sense comparator is 1 (or, HIGH). This permits CMP to flow through switch 38, and the circuit operates as described herein to deliver power to the load. If, however, the value of the FB signal and the reference signal is outside a predetermined range (open circuit or short circuit condition), the output of the current sense comparator is 0 (or, LOW), prohibiting the CMP signal from flowing through the switch 38. (Of course, the reverse can be true, in which the switch triggers on a LOW condition). Instead a minimal voltage Vmin is supplied by switch 38 (not shown) and applied to comparator 28 until the current sense comparator indicates permissible current flowing through Rs. Accordingly, switch 38 includes appropriate programmable voltage selection Vmin for when the sense current is 0. Turning again to FIG. 2b, the effect of this operation is a lowering of the CMP DC value to a nominal, or minimum value (i.e., CMP=Vmin) so that a high voltage condition is not appearing on the transformer TX1. Thus, the crossover point 36 is shifted to the left, thereby decreasing the amount of overlap between complementary switches (recall Switch_C is turned ON at the intersection point 36). Likewise, current sense comparator 42 is connected to the frequency generator 22 to turn the generator 22 off when the sense value is 0 (or some other preset value indicative of an open-circuit condition). The CMP is fed into the protection circuit 62. This is to shut off the frequency sweeper 22 if the CCFL is removed during operation (open-circuit condition).

To protect the circuit from an over-voltage condition, the present embodiment includes a protection circuit 60, the operation of which is provided below (the description of the over current protection through the current sense comparator 42 is provided above). The circuit 60 includes a protection comparator 62 which compares signal CMP with a voltage signal 66 derived from the load 20. In one embodiment, voltage signal is derived from the voltage divider C2 and C3 (i.e., in parallel with load 20), as shown in FIG. 2. In the open-lamp condition, the frequency sweeper continues sweeping until the OVP signal 66 reaches a threshold. The OVP signal 62 is taken at the output capacitor divider C2 and C3 to detect the voltage at the output of the transformer TX1. To simplify the analysis, these capacitors also represent the lump capacitor of the equivalent load capacitance. The threshold is a reference and circuit is being designed so that the voltage at the secondary side of the transformer is greater than the minimum striking voltage (e.g., as may be required by the LCD panel) while less than the rated voltage of the transformer. When OVP exceeds the threshold, the frequency sweeper stops the frequency sweeping. Meanwhile, the current-sense 42 detects no signal across the sense resistor Rs. Therefore the signal at 24, the output of a switch block 38, is set to be at minimum value so that minimum overlap between switches A,C and B,D is seen. In one embodiment, a timer 64 is initiated once the OVP exceeds the threshold, thereby initiating a time-out sequence. The duration of the time-out can be designed according to the requirement of the loads (e.g., CCFLs of an LCD panel), but could alternately be set at some programmable value. Drive pulses are disabled once the time-out is reached, thus providing safe-operation output of the converter circuit. That is, circuit 60 provides a sufficient voltage to ignite the lamp, but will shut off after a certain period if the lamp is not connected to the converter, so that erroneous high voltage is avoided at the output. This duration is necessary since a non-ignited lamp is similar to an open-lamp condition.

Figure 3:
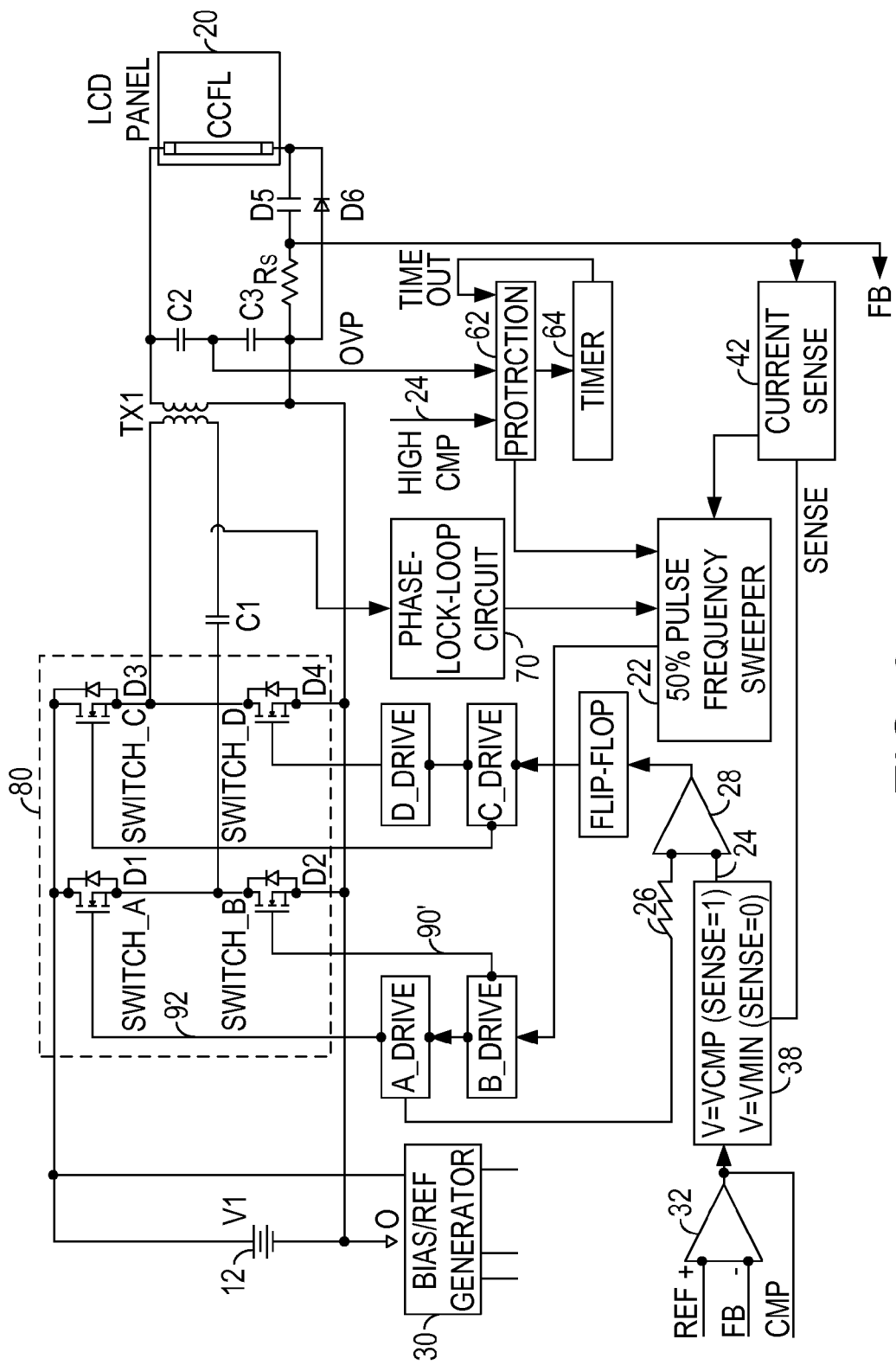
FIG. 3 is another embodiment of a DC/AC converter circuit of the present invention.

FIG. 3 and FIG. 3*a*-FIG. 3*f* depict another embodiment of the DC/AC circuit of the present invention. In this embodiment, the circuit operates in a similar manner as provided in FIG. 2 and FIG. 2*a*-FIG. 2*f*, however this embodiment further includes a phase lock loop circuit (PLL) 70 for controlling the frequency sweeper 22, and a flip-flop circuit 72 to time the input of a signal into C_Drive. As can be understood by the timing diagrams, if the 50% driving pulses of switches C and D are shifted to the right by increasing the level of CMP, an increase in the overlap between switches A,C and B,D is realized, thus increasing the energy delivered to the transformer. In practice, this corresponds to the higher-lamp current operation (as may be required, e.g., by a manual increase in the REF voltage, described above). Conversely, shifting the driving pulses of switches C and D to the left (by decreasing the CMP signal) decreases the energy delivered. The phase-lock-loop circuit 70 maintains the phase relationship between the feedback current (through Rs) and tank current (through TX1/C1) during normal operation, as shown in FIG. 3. The PLL circuit 70 can include input signals from the tank circuit (C1 and the primary of TX1) signal 98 and Rs (FB signal, described above). Once the CCFL is ignited, and the current in the CCFL is detected through Rs, the PLL 70 circuit is activated which locks the phase the phase between the lamp current and the current in the primary resonant tank (C1 and transformer primary). That is, the PLL is provided to adjust the frequency of the frequency sweeper 22 for any parasitic variations such as temperature effect, mechanical arrangement like wiring between the converter and the LCD panel and distance between the lamp and metal chassis of LCD panel that affect the capacitance and inductance. In one embodiment, the system maintains a phase difference of 180 degrees between the resonant tank circuit and the current through Rs (load current). Thus, irrespective of the particular load conditions and/or the operating frequency of the resonant tank circuit, the system finds an optimal operation point.

Figure 3B:
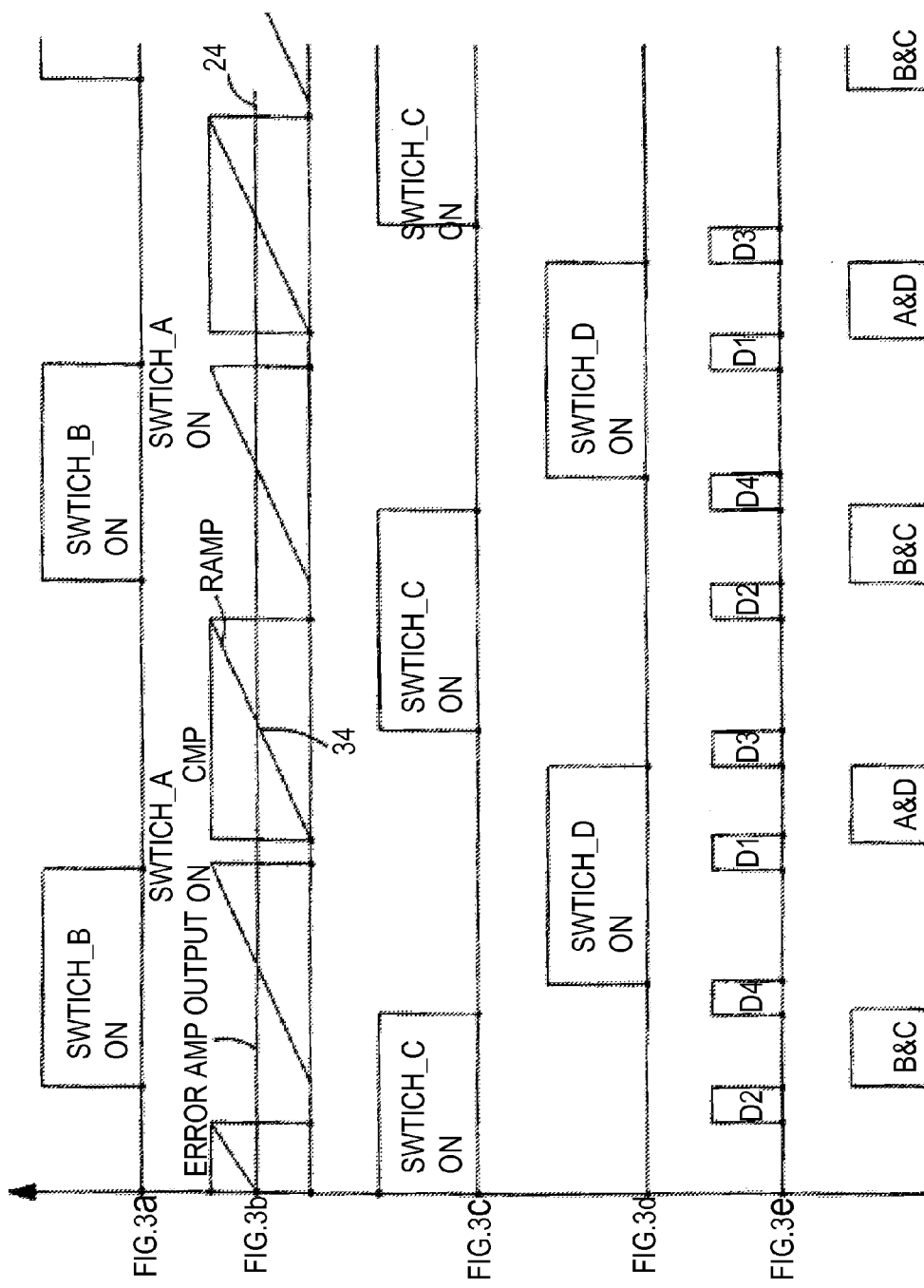

The operation of the feedback loop of FIG. 3 is similar to the description above for FIG. 2. However, as shown in FIG. 3*b*, this embodiment times the output of an initiating signal through C_Drive through flip-flop 72. For instance, during normal operation, the output of the error amplifier 32 is fed through the controlled switch block 38 (described above), resulting in signal 24. A certain amount of overlap between switches A,C and B,D is seen through comparator 28 and flip-flop 72 which drives switches C and D (recall D_Drive produces the complementary signal of C_Drive). This provides a steady-state operation for the CCFL (panel) load. Considering the removal of the CCFL (panel) during the normal operation, CMP rises to the rail of output of the error amplifier and triggers the protection circuit immediately. This function is inhibited during the ignition period.

Referring briefly to FIG. 3*a*-FIG. 3*f*, the triggering of switches C and D, through C-Drive and D_Drive, is, in this embodiment, alternating as a result of the flip-flop circuit 72. As is shown in FIG. 3*b*, the flip-flop triggers every other time, thereby initiating C_Drive (and, accordingly, D_Drive). The timing otherwise operates in the same way as discussed above with reference to.

Figure 4A:
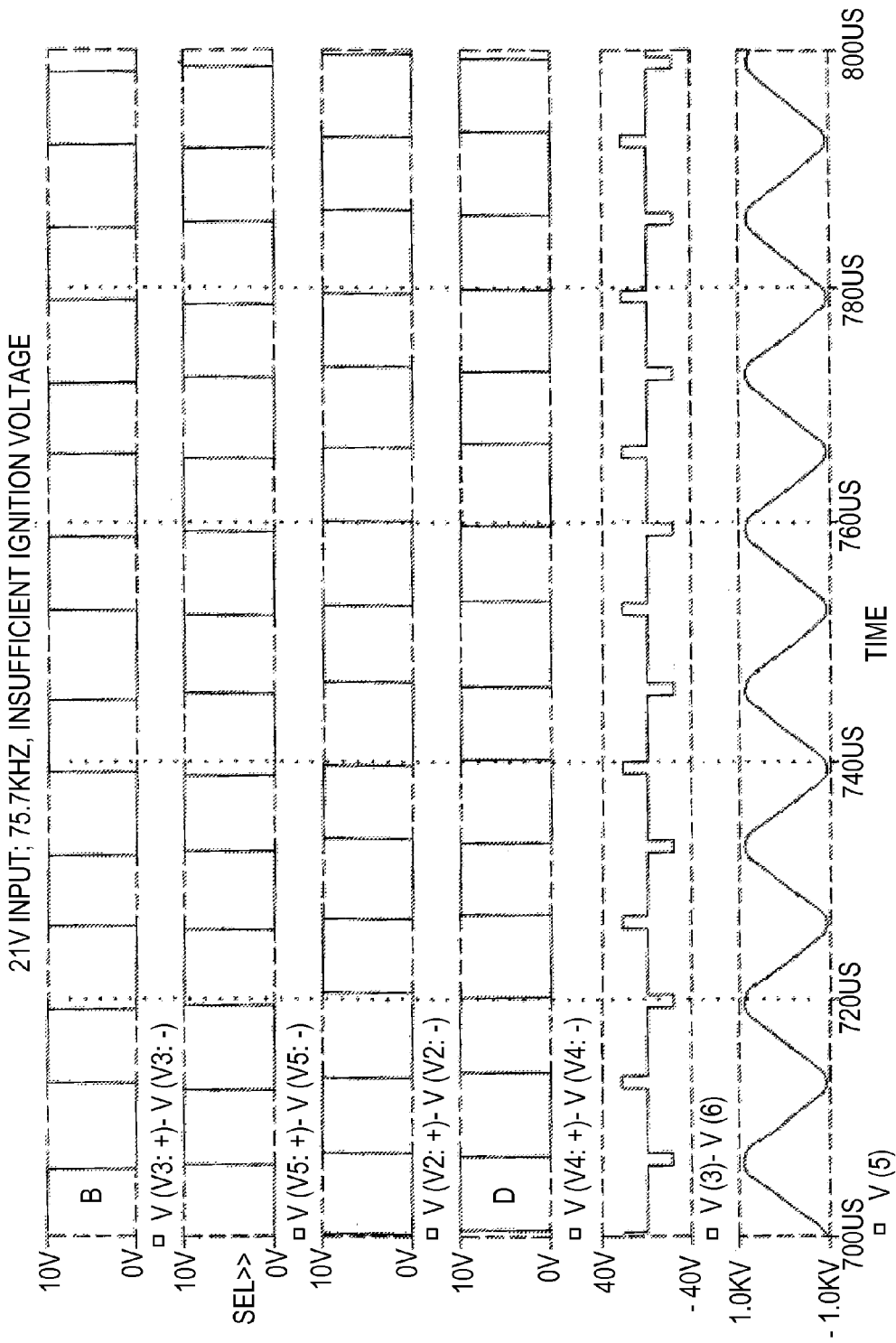
FIG. 4a-FIG. 4f depict emulation diagrams for the circuits shown in FIG. 2 and FIG. 3.
Figure 4B:
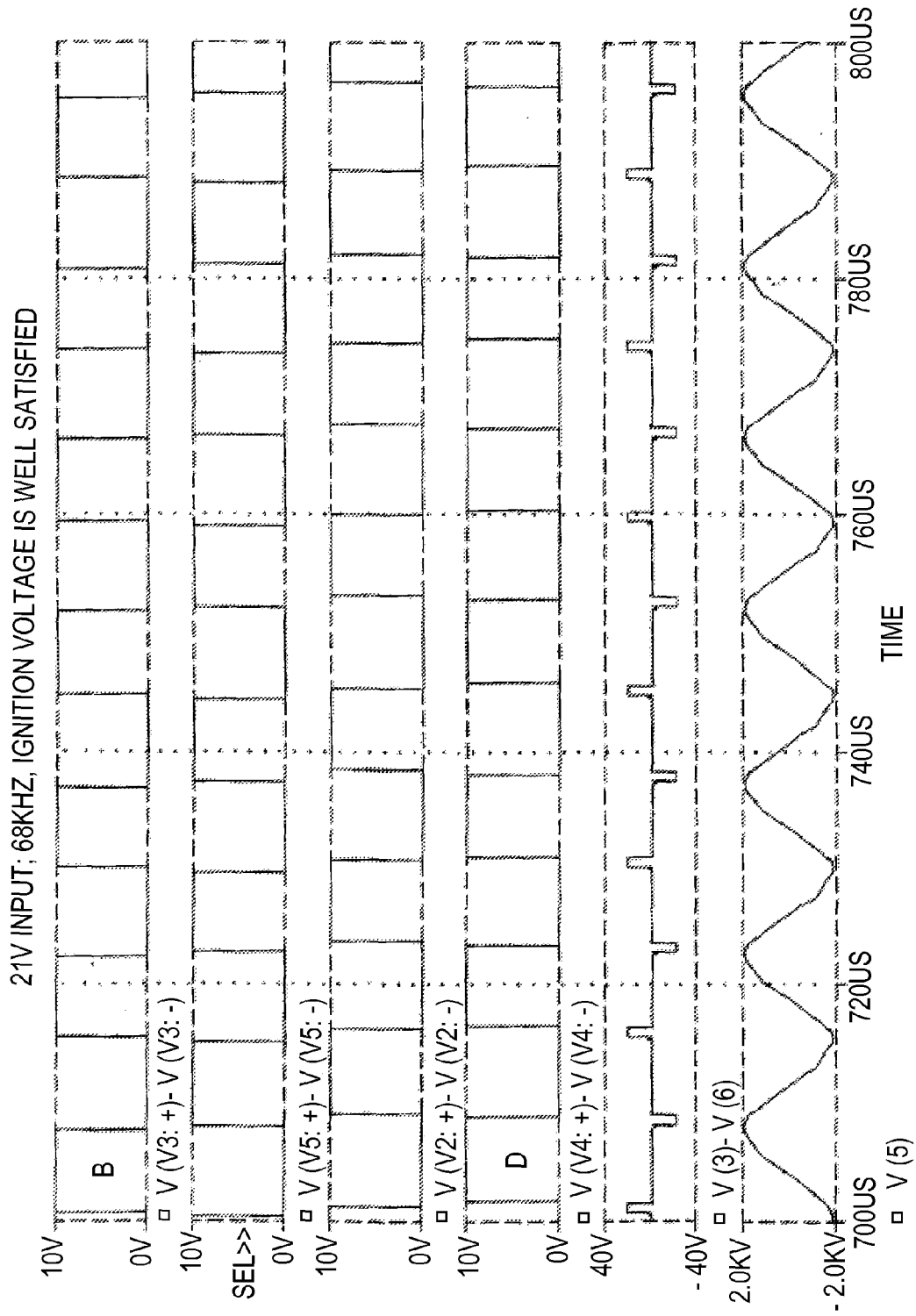
Figure 4C:
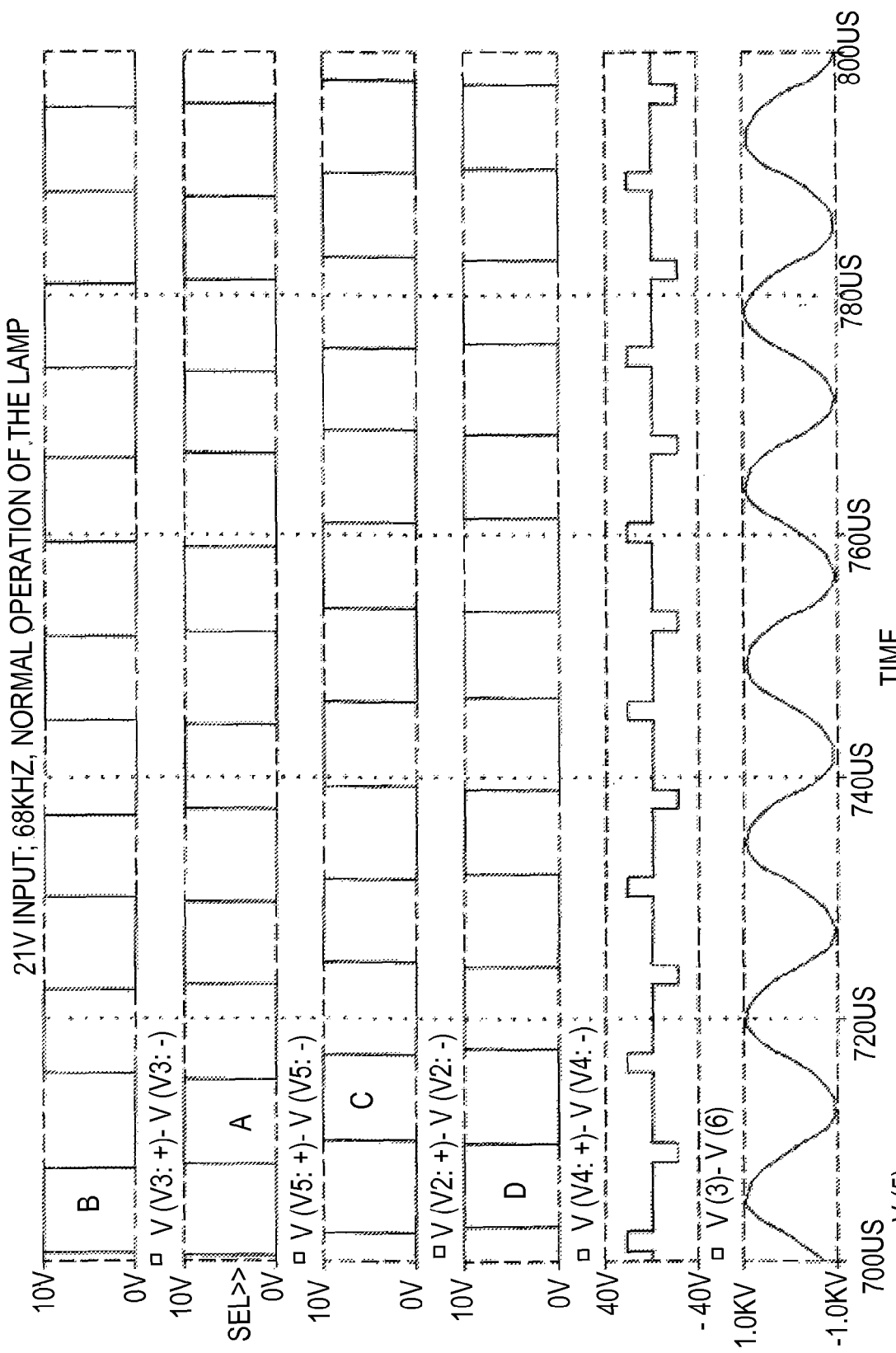
Figure 4D:
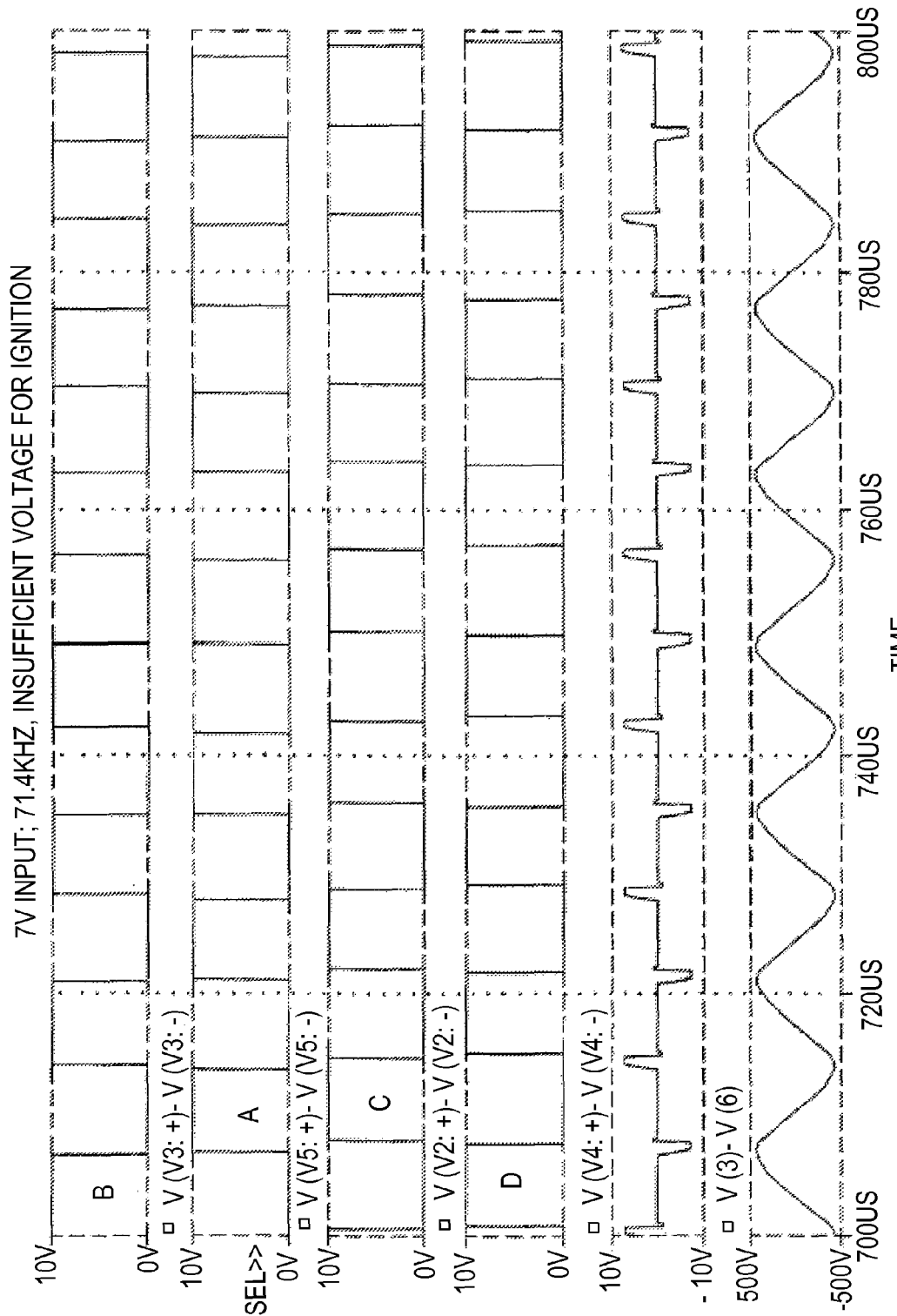
Figure 4E:
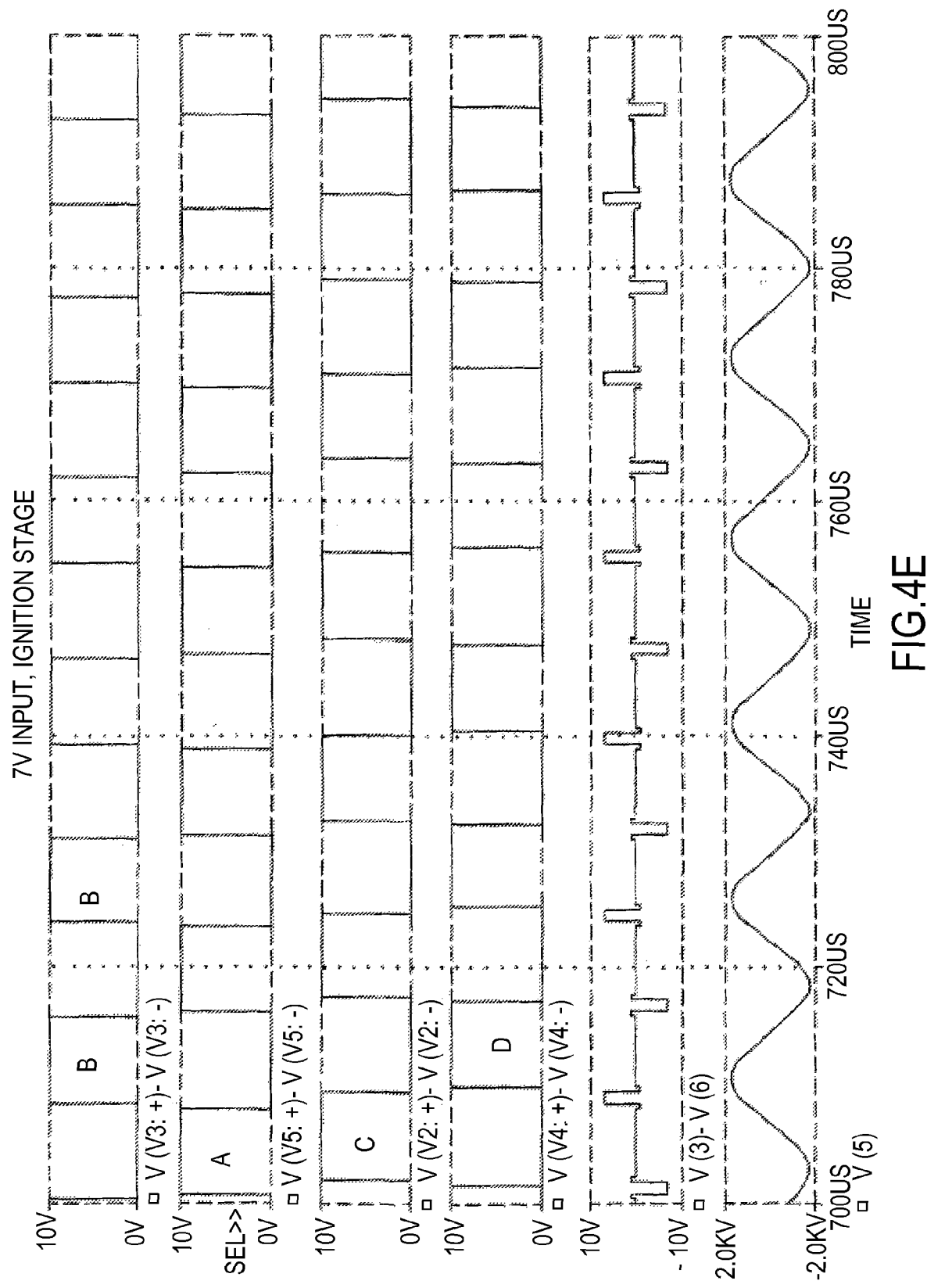
Figure 4F:
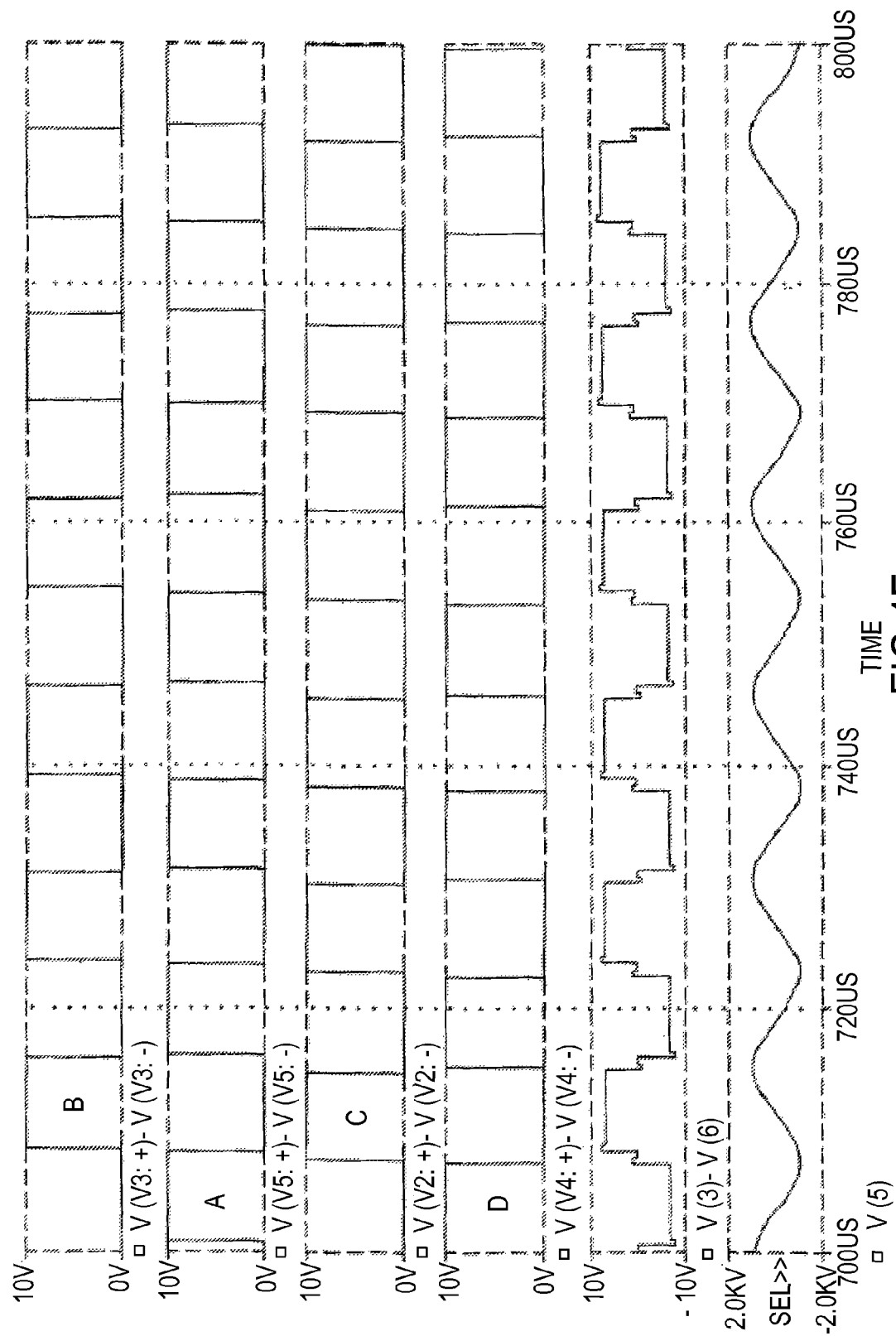

Referring now to FIG. 4*a*-FIG. 4*f*, the output circuit of FIG. 2 or FIG. 3 is emulated. For example, FIG. 4*a* shows that at 21V input, when the frequency sweeper approaches 75.7 KHz (0.5 us overlapping), the output is reaching 1.67 KVp-p. This voltage is insufficient to turn on the CCFL if it requires 3300 Vp-p to ignite. As the frequency decreases to say 68 KHz, the minimum overlap generates about 3.9 KVp-p at the output, which is sufficient to ignite the CCFL. This is illustrated in FIG. 4*b*. At this frequency, the overlap increases to 1.5 us gives output about 1.9 KVp-p to operate the 130 Kohm lamp impedance. This has been shown in FIG. 4*c*. As another example, FIG. 4*d* illustrates the operation while the input voltage is 7V. At 71.4 KHz, output is 750Vp-p before the lamp is striking. As the frequency decreases, the output voltage increases until the lamp ignites. FIG. 4*e* shows that at 65.8 KHz, the output reaches 3500Vp-p. The regulation of the CCFL current is achieved by adjusting the overlap to support 130 Kohm impedance after ignition. The voltage across the CCFL is now 1.9 KVp-p for a 660Vrms lamp. This is also illustrated in FIG. 4*f*. Although not shown, the emulation of the circuit of FIG. 3 behaves in a similar manner.

It should be noted that the difference between the first and second embodiments (i.e., by the addition of the flip flop and the PLL in FIG. 3) will not effect the overall operational parameters set forth in FIG. 4*a*-FIG. 4*f*. However, the addition of the PLL has been determined to account for non-ideal impedances that develop in the circuit, and may be added as an alternative to the circuit shown in FIG. 2. Also, the addition of the flip-flop permits the removal of the constant current circuit, described above.

Thus, it is evident that there has been provided a high efficiency adaptive DC/AC converter circuit that satisfies the aims and objectives stated herein. It will be apparent to those skilled in the art that modifications are possible. For example, although the present invention has described the use of MOS-FETs for the switched, those skilled in the art will recognize that the entire circuit can be constructed using BJT transistors, or a mix of any type of transistors, including MOSFETs and BJTs. Other modifications are possible. For example, the drive circuitry associated with Drive_B and Drive_D may be comprised of common-collector type circuitry, since the associated transistors are coupled to ground and are thus not subject to floating conditions. The PLL circuit described herein is can be a generic PLL circuit 70, as is known in the art, appropriately modified to accept the input signal and generate the control signal, described above. The pulse generator 22 can be a pulse width modulation circuit (PWM) or frequency width modulation circuit (FWM), both of which are well known in the art. Likewise, the protection circuit 62 and timer are constructed out of known circuits and are appropriately modified to operate as described herein. Other circuitry will become readily apparent to those skilled in the art, and all such modifications are deemed within the spirit and scope of the present invention, only as limited by the appended claims.

What is claimed is:

1. A DC to AC cold cathode fluorescent lamp inverter circuit, comprising:
    a step-up transformer with a primary winding and a secondary winding for providing increased voltage to a cold cathode fluorescent lamp, wherein said primary winding and said secondary winding are electrically coupled to ground;
    a first MOSFET switch coupled to said step-up transformer for selectively allowing direct current of a first polarity to flow through said step-up transformer;
    a second MOSFET switch coupled to said step-up transformer for selectively allowing direct current of a second polarity to flow through said step-up transformer;
    a capacitor divider electrically coupled to said cold cathode fluorescent lamp for providing a first voltage signal representing a voltage across said cold cathode fluorescent lamp;
    a first feedback signal line coupled to said capacitor divider for receiving said first voltage signal from said capacitor divider representing said voltage across said cold cathode fluorescent lamp;
    a timer circuit coupled to said first feedback signal line for providing a time-out sequence of a predetermined duration when said first voltage signal exceeds a predetermined threshold; and
    a protection circuit coupled to said timer circuit, said first switch and said second switch for shutting down said first switch and said second switch when said first voltage signal exceeds said predetermined threshold after said predetermined duration.

2. A DC to AC cold cathode fluorescent lamp inverter circuit as claimed in claim 1, wherein said predetermined duration is sufficient for ignition of said cold cathode fluorescent lamp when properly operating.

3. A DC to AC cold cathode fluorescent lamp inverter circuit as claimed in claim 1, wherein said predetermined threshold represents a value of said voltage across said cold cathode fluorescent lamp greater than a minimum striking voltage of said cold cathode fluorescent lamp and less than a rated voltage of said step-up transformer.

4. A DC to AC cold cathode fluorescent lamp inverter circuit as claimed in claim 1, further comprising:
    a sense resistor electrically coupled to said cold cathode fluorescent lamp and electrically coupled to ground for providing a second voltage signal representing current through said cold cathode fluorescent lamp;
    a second feedback signal line coupled to said sense resistor for receiving said second voltage signal from said sense resistor representing said current through said cold cathode fluorescent lamp; and
    a feedback control circuit coupled to said second feedback signal line for adjusting power to said cold cathode fluorescent lamp to a power level such that said second voltage signal approaches a reference value representing desired load conditions of said cold cathode fluorescent lamp.

5. A DC to AC cold cathode fluorescent lamp inverter circuit as claimed in claim 4, wherein said reference value has a minimum representing minimum current through said cold cathode fluorescent lamp and a maximum representing maximum current through said cold cathode fluorescent lamp.

6. A DC to AC cold cathode fluorescent lamp inverter circuit as claimed in claim 1, further comprising:
    an ignition circuit coupled to said first switch and said second switch for providing lower amount of power to said cold cathode fluorescent lamp prior to ignition of said cold cathode fluorescent lamp.

7. A DC to AC cold cathode fluorescent lamp inverter circuit as claimed in claim 1, further comprising:
    a third MOSFET switch coupled to said first MOSFET switch and said step-up transformer for providing a first electrical path through said primary winding of said step-up transformer to ground when said third MOSFET switch and said first MOSFET switch are simultaneously on;
    a fourth MOSFET switch coupled to said MOSFET second switch and said step-up transformer for providing a second electrical path through said primary winding of said step-up transformer to ground when said fourth MOSFET switch and said second MOSFET switch are simultaneously on;
    a sense resistor electrically coupled to said cold cathode fluorescent lamp and electrically coupled to ground for providing a second voltage signal representing current through said cold cathode fluorescent lamp;
    a second feedback signal line coupled to said sense resistor for receiving said second voltage signal from said sense resistor representing said current through said cold cathode fluorescent lamp; and
    a feedback control circuit coupled to said second feedback signal line, said first switch and said third switch for adjusting time when said third switch and said first switch are simultaneously on such that said second voltage signal approaches a reference value representing desired load conditions of said cold cathode fluorescent lamp.

8. A liquid crystal display unit comprising:
    a liquid crystal display panel;
    a cold cathode fluorescent lamp for illuminating said liquid crystal display panel;
    a step-up transformer with a primary winding and a secondary winding coupled to said cold cathode fluorescent lamp for providing increased voltage to said cold cathode fluorescent lamp, wherein said primary winding and said secondary winding are electrically coupled to ground;
    a first MOSFET switch coupled to said step-up transformer for selectively allowing direct current of a first polarity to flow through said step-up transformer;
    a second MOSFET switch coupled to said step-up transformer for selectively allowing direct current of a second polarity to flow through said step-up transformer;

a capacitor divider electrically coupled to said cold cathode fluorescent lamp for providing a first voltage signal representing a voltage across said cold cathode fluorescent lamp;

a first feedback signal line coupled to said capacitor divider for receiving said first voltage signal from said capacitor divider representing said voltage across said cold cathode fluorescent lamp;

a timer circuit coupled to said first feedback signal line for providing a time-out sequence of a predetermined duration when said first voltage signal exceeds a predetermined threshold; and a protection circuit coupled to said timer circuit, said first switch and said second switch for shutting down said first switch and said second switch when said first voltage signal exceeds said predetermined threshold after said predetermined duration.

9. A liquid crystal display unit as claimed in claim 8, wherein said predetermined duration is sufficient for ignition of said cold cathode fluorescent lamp when properly operating.

10. A liquid crystal display unit as claimed in claim 8, wherein said predetermined threshold represents a value of said voltage across said cold cathode fluorescent lamp greater than a minimum striking voltage of said cold cathode fluorescent lamp and less than a rated voltage of said step-up transformer.

11. A liquid crystal display unit as claimed in claim 8, further comprising:

a sense resistor electrically coupled to said cold cathode fluorescent lamp and electrically coupled to ground for providing a second voltage signal representing current through said cold cathode fluorescent lamp;

a second feedback signal line coupled to said sense resistor for receiving said second voltage signal from said sense resistor representing said current through said cold cathode fluorescent lamp;

a feedback control circuit coupled to said second feedback signal line for adjusting power to said cold cathode fluorescent lamp to a power level such that said second voltage signal approaches a reference value representing desired load conditions of said cold cathode fluorescent lamp.

12. A liquid crystal display unit as claimed in claim 11, wherein said reference value has a minimum representing minimum current through said cold cathode fluorescent lamp and a maximum representing maximum current through said cold cathode fluorescent lamp.

13. A liquid crystal display unit as claimed in claim 8, further comprising:

an ignition circuit coupled to said first switch and said second switch for providing lower amount of power to said cold cathode fluorescent lamp prior to ignition of said cold cathode fluorescent lamp.

14. A liquid crystal display unit as claimed in claim 8, further comprising:

a third MOSFET switch coupled to said first MOSFET switch and said step-up transformer for providing a first electrical path through said primary winding of said step-up transformer to ground when said third MOSFET switch and said first MOSFET switch are simultaneously on;

a fourth MOSFET switch coupled to said second switch and said step-up transformer for providing a second electrical path through said primary winding of said step-up transformer to ground when said fourth MOSFET switch and said second MOSFET switch are simultaneously on;

a sense resistor electrically coupled to said cold cathode fluorescent lamp and electrically coupled to ground for providing a second voltage signal representing current through said cold cathode fluorescent lamp;

a second feedback signal line coupled to said sense resistor for receiving said second voltage signal from said sense resistor representing said current through said cold cathode fluorescent lamp; and a feedback control circuit coupled to said second feedback signal line, said first switch and said third switch for adjusting time when said third switch and said first switch are simultaneously on such that said second voltage signal approaches a reference value representing desired load conditions of said cold cathode fluorescent lamp.

15. A method for providing power to a cold cathode fluorescent lamp of a liquid crystal display unit, said method comprising:

providing direct current of a first polarity through a primary winding of a transformer;

providing direct current of a second polarity through said primary winding of said transformer;

providing increased voltage from said transformer to said cold cathode fluorescent lamp;

providing a first feedback signal representing a voltage across said cold cathode fluorescent lamp from a capacitor divider electrically coupled to said cold cathode fluorescent lamp;

receiving said first feedback signal representing said voltage across said cold cathode fluorescent lamp;

providing a time-out sequence of a predetermined duration when said first voltage signal exceeds a predetermined threshold; and shutting down power to said cold cathode fluorescent lamp when said first voltage signal exceeds said predetermined threshold after said predetermined duration.

16. A method as claimed in claim 15, wherein said predetermined duration is sufficient for ignition of said cold cathode fluorescent lamp when properly operating and said predetermined threshold represents a value of said voltage across said cold cathode fluorescent lamp greater than a minimum striking voltage of said cold cathode fluorescent lamp and less than a rated voltage of said transformer.

17. A method as claimed in claim 15, further comprising:

providing a second voltage signal from a sense resistor electrically coupled to said cold cathode fluorescent lamp and electrically coupled to ground representing current through said cold cathode fluorescent lamp;

receiving said second voltage signal from said sense resistor representing said current through said cold cathode fluorescent lamp; and adjusting power to said cold cathode fluorescent lamp to a power level such that said second voltage signal approaches a reference value representing desired load conditions of said cold cathode fluorescent lamp.

18. A method as claimed in claim 17, wherein said reference value has a minimum representing minimum current through said cold cathode fluorescent lamp and a maximum representing maximum current through said cold cathode fluorescent lamp.

19. A method as claimed in claim 15, further comprising:

providing lower amount of power to said cold cathode fluorescent lamp prior to ignition of said cold cathode fluorescent lamp.

20. A method as claimed in claim 15, further comprising:
providing a first electrical path through said primary winding of said transformer to ground when a first plurality of switches are simultaneously on;
providing a second electrical path through said primary winding of said transformer to ground when a second plurality of switches are simultaneously on;
providing a second voltage signal from a sense resistor electrically coupled to said cold cathode fluorescent lamp and electrically coupled to ground representing current through said cold cathode fluorescent lamp;
receiving said second voltage signal from said sense resistor representing said current through said cold cathode fluorescent lamp; and
adjusting time when said first plurality of switches are simultaneously on and said second plurality of switches are simultaneously on such that said second voltage signal approaches a reference value representing desired load conditions of said cold cathode fluorescent lamp.

* * * * *